(12) United States Patent
Lee et al.

(10) Patent No.: US 11,061,544 B2
(45) Date of Patent: Jul. 13, 2021

(54) METHOD AND ELECTRONIC DEVICE FOR PROCESSING INPUT

(71) Applicant: Samsung Electronics Co., Ltd., Gyeonggi-do (KR)

(72) Inventors: Youn-Sun Lee, Seoul (KR); Seok-Hee Na, Incheon (KR)

(73) Assignee: Samsung Electronics Co., Ltd

( * ) Notice: Subject to any disclaimer, the term of this patent is extended or adjusted under 35 U.S.C. 154(b) by 97 days.

(21) Appl. No.: 15/297,354

(22) Filed: Oct. 19, 2016

(65) Prior Publication Data

US 2017/0109022 A1    Apr. 20, 2017

(30) Foreign Application Priority Data

Oct. 19, 2015    (KR) .................... 10-2015-0145550

(51) Int. Cl.
| | | |
|---|---|---|
| *G06F 3/048* | (2013.01) | |
| *G06F 3/0484* | (2013.01) | |
| *G06F 3/0486* | (2013.01) | |
| *G06F 3/0483* | (2013.01) | |
| *G06F 3/0485* | (2013.01) | |

(Continued)

(52) U.S. Cl.
CPC ........ *G06F 3/04845* (2013.01); *G06F 3/0482* (2013.01); *G06F 3/0483* (2013.01); *G06F 3/0485* (2013.01); *G06F 3/0486* (2013.01); *G06F 3/04842* (2013.01); *G06F 3/04883* (2013.01); *G06F 3/04815* (2013.01);
(Continued)

(58) Field of Classification Search
CPC .. G06F 3/048; G06F 3/04883; G06F 3/04845; G06F 3/0482; G06F 3/0483; G06F 3/04842; G06F 3/0485; G06F 3/0486; G06F 3/04815; G06F 2203/04104; G06F 2203/04108

See application file for complete search history.

(56) References Cited

U.S. PATENT DOCUMENTS 6,545,669 B1     4/2003  Kinawi et al.
9,792,014 B2 *  10/2017  Feiereisen ............ G06F 3/04842
(Continued)

FOREIGN PATENT DOCUMENTS

KR    1020080047125    5/2008
KR    1020090121033    11/2009
(Continued)

OTHER PUBLICATIONS

Graham Spencer, iOS8:Tips, Tricks, and Details—MacStories, Sep. 17, 2014, p. 6 (Year: 2014).*

(Continued)

*Primary Examiner* — Mahelet Shiberou
(74) *Attorney, Agent, or Firm* — The Farrell Law Firm, P.C.

(57) ABSTRACT

Methods and electronic devices are provided for processing an input. A first object is displayed on a display of the electronic device. A first input related to the first object is received from a user of the electronic device. The first object is moved according to the first input. A speed at which the first object is moving is determined. The speed is compared with a preset threshold. An instruction corresponding to the first input is determined based on a comparison of the speed with the preset threshold. The instruction is executed.

10 Claims, 53 Drawing Sheets

(51) Int. Cl.
*G06F 3/0482* (2013.01)
*G06F 3/0488* (2013.01)
*G06F 3/0481* (2013.01)

(52) U.S. Cl.
CPC .............. *G06F 2203/04104* (2013.01); *G06F 2203/04108* (2013.01)

(56) References Cited

U.S. PATENT DOCUMENTS

| | | | |
|---|---|---|---|
| 10,025,461 B2* | 7/2018 | Liu | G06F 3/0484 |
| 2007/0064004 A1 | 3/2007 | Bonner et al. | |
| 2008/0123479 A1 | 5/2008 | Kim | |
| 2009/0093277 A1* | 4/2009 | Lee | G06F 3/04817 455/566 |
| 2010/0095240 A1* | 4/2010 | Shiplacoff | G06F 3/04842 715/784 |
| 2010/0295805 A1* | 11/2010 | Shin | G06F 3/04883 345/173 |
| 2010/0299599 A1* | 11/2010 | Shin | G06F 3/0485 715/702 |
| 2010/0299638 A1* | 11/2010 | Choi | G06F 3/04883 715/835 |
| 2010/0309228 A1* | 12/2010 | Mattos | G06F 1/1626 345/654 |
| 2012/0192056 A1* | 7/2012 | Migos | G06F 17/241 715/230 |
| 2012/0287061 A1* | 11/2012 | Yang | G06F 3/0488 345/173 |
| 2013/0125043 A1* | 5/2013 | Jeon | G06F 3/0488 715/782 |
| 2013/0167081 A1 | 6/2013 | Park | |
| 2013/0227490 A1* | 8/2013 | Thorsander | G06F 3/04883 715/841 |
| 2013/0286035 A1* | 10/2013 | Chakirov | G06F 3/0488 345/589 |
| 2014/0033032 A1* | 1/2014 | Reynolds | G06F 3/0481 715/702 |
| 2014/0143683 A1* | 5/2014 | Underwood, IV | H04L 51/38 715/752 |
| 2014/0143738 A1* | 5/2014 | Underwood, IV | G06F 3/0482 715/863 |
| 2014/0223347 A1* | 8/2014 | Seo | G06F 3/0486 715/769 |
| 2014/0282243 A1* | 9/2014 | Eye | G06F 3/04883 715/810 |
| 2014/0327629 A1* | 11/2014 | Jobs | G06F 3/0488 345/173 |
| 2014/0380155 A1 | 12/2014 | Kim | |
| 2015/0113436 A1* | 4/2015 | Penha | G06F 3/0485 715/752 |
| 2015/0346916 A1* | 12/2015 | Jisrawi | G06F 3/04817 715/752 |
| 2015/0365306 A1* | 12/2015 | Chaudhri | G06F 3/0482 715/736 |
| 2016/0065509 A1* | 3/2016 | Yang | G06F 3/04886 715/752 |
| 2016/0266758 A1* | 9/2016 | Li | G06F 3/0482 |

FOREIGN PATENT DOCUMENTS

| | | |
|---|---|---|
| KR | 10-1459552 | 11/2014 |
| KR | 10-1569427 | 11/2015 |
| KR | 10-1899972 | 9/2018 |

OTHER PUBLICATIONS

David Ludlow, How to delete, notarchive, Gmail messages on iPhone, Dec. 26, 2014, pp. 3-4 STEP 3 (Year: 2014).*

* cited by examiner

METHOD AND ELECTRONIC DEVICE FOR PROCESSING INPUT

PRIORITY

This application claims priority under 35 U.S.C. § 119(a) to Korean Patent Application Ser. No. 10-2015-0145550, which was filed in the Korean Intellectual Property Office on Oct. 19, 2015, the content of which is incorporated herein by reference.

BACKGROUND

1. Field of the Disclosure

The present disclosure relates generally to a method of processing an input by an electronic device, and more particularly, to a method of determining a command corresponding to an input received by an electronic device and processing the determined command.

2. Description of the Related Art

Recently, the use of electronic devices (for example, smart phones, tablet Personal Computers (PCs), laptops, notebooks, wearable devices, and the like) that provide various functions has been generalized. Further, electronic devices may provide a touch input type, a proximity input type (for example, a hovering input type or type that recognizes a motion or gesture), and/or an input type through another input means (for example, a keyboard, a mouse, or the like).

The user may control the electronic device to execute a desired function through various input types provided by the electronic device.

The user may provide input corresponding to various functions in order to control the electronic device to execute the various functions. Accordingly, when the user wants to execute a second function while performing a first input corresponding to a first function, the user must stop performing the first input and perform a second input corresponding to the second function.

SUMMARY

The present disclosure has been made to address at least the above problems and/or disadvantages and to provide at least the advantages described below. Accordingly, an aspect of the present disclosure provides methods and devices for determining and processing a command corresponding to a received input from a user of the device.

In accordance with an aspect of the present disclosure, a method is provided for processing an input by an electronic device. A first object is displayed on a display of the electronic device. A first input related to the first object is received from a user of the electronic device. The first object is moved according to the first input. A speed at which the first object is moving is determined. The speed is compared with a preset threshold. An instruction corresponding to the first input is determined based on a comparison of the speed with the preset threshold. The instruction is executed.

In accordance with another aspect of the present disclosure, an electronic device is provided that includes a display that displays a first object, and an input interface that receives a first input related to the first object from a user of the electronic device. The electronic device also includes a processor that moves the first object according to the first input, determines a speed at which the first object is moving, compares the speed with a preset threshold, determines and instruction corresponding to the first input based on a comparison of the speed with the preset threshold, and executes the instruction.

In accordance with another aspect of the present disclosure, a non-transitory computer-readable recording medium having a program recorded therein to be performed in a computer is provided. The program includes instructions to instruct a processor to perform operations when being executed by the processor. The operations includes receiving, from a user of the electronic device, a first input related to a first object displayed on a display, moving the first object according to the first input, determining a speed at which the first object is moving, comparing the speed with a preset threshold, determining an instruction corresponding to the first input based on a comparison of the speed with the preset threshold, and executing the instruction.

In accordance with another aspect of the present disclosure, a method is provided for processing an input by an electronic device. A first object is displayed on a display of the electronic device. A first input and a second input related to the first object are received from a user of the electronic device. A first speed of a first point and a second speed of a second point within the first object are determined corresponding to each of the first input and second input. The first speed of the first point and the second speed of the second point are compared with a preset threshold. Instructions corresponding to the first input and the second input determined are executed based on a result of the comparison.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
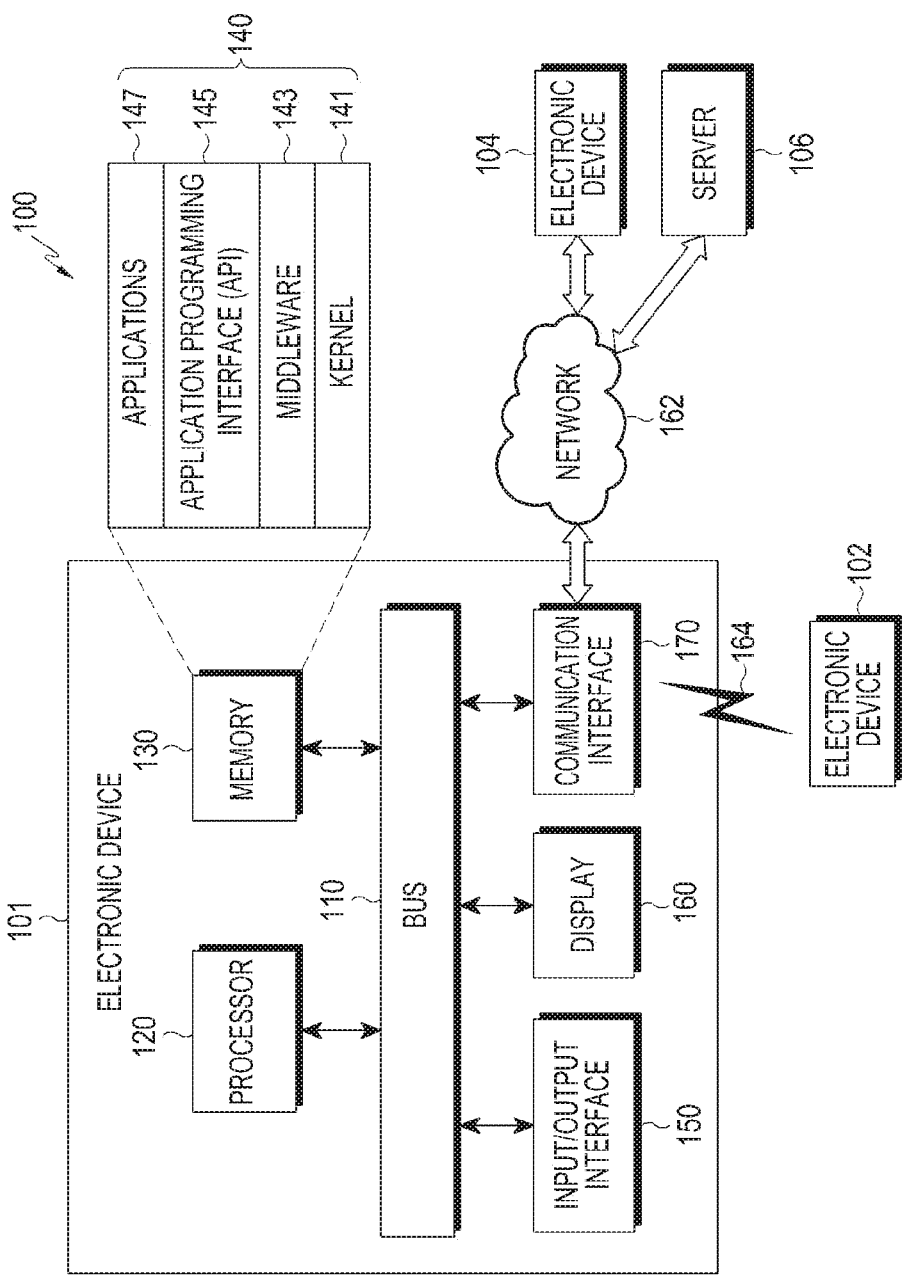
FIG. 1 is a diagram illustrating a network environment including an electronic device, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

As used herein, the expressions "have", "may have", "include", and "may include" refer to the existence of a corresponding feature (e.g., numeral, function, operation, or constituent element such as component), and do not exclude one or more additional features.

In the present disclosure, the expressions "A or B", "at least one of A or/and B", and "one or more of A or/and B" may include all possible combinations of the items listed. For example, the expression "A or B", "at least one of A and B", or "one or more of A and B" refers to at least one A, at least one B, or at least one A and at least one B.

The expressions "a first", "a second", "the first", or "the second", as used herein, may modify various components regardless of the order and/or the importance but does not limit the corresponding components. For example, a first user device and a second user device indicate different user devices although both are user devices. Additionally, a first element may be referred to as a second element, and similarly, a second element may be referred to as a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there is no element (e.g., third element) interposed between them.

The expression "configured to", as used herein, may be used interchangeably with, for example, "suitable for", "having the capacity to", "designed to", "adapted to", "made to", or "capable of", according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meanings as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even a term defined in the present disclosure should not be interpreted to exclude embodiments of the present disclosure.

An electronic device, according to an embodiment of the present disclosure, may include at least one of, for example, a smart phone, a tablet PC, a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a TV box, a game console, an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic devices for a ship (e.g., a navigation device for a ship, and a gyro-compass), avionics, security devices, an automotive head unit, a robot for home or industry, an automated teller machine (ATM) in banks, point of sales (POS) terminal in a shop, or an Internet of Things (IoT) device (e.g., a light bulb, various sensors, electric or gas meter, a sprinkler device, a fire alarm, a thermostat, a streetlamp, a toaster, sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of new technology.

Hereinafter, an electronic device, according to various embodiments, will be described with reference to the accompanying drawings. In the present disclosure, the term "user" may indicate a person using an electronic device or a device (e.g., an artificial intelligence electronic device) using an electronic device.

An electronic device 101 within a network environment 100, according to various embodiments, is described with reference to FIG. 1. The electronic device 101 includes a bus 110, a processor 120, a memory 130, an input/output interface 150, a display 160, and a communication interface 170. In some embodiments, the electronic device 101 may omit at least one of the above elements or may include additional elements.

The bus 110 may include, for example, a circuit for interconnecting the elements 110 to 170 and transferring communication (for example, control messages and/or data) between the elements.

The processor 120 may include one or more of a CPU, an application processor (AP), and a communication processor (CP). For example, the processor 120 may carry out operations or data processing related to control and/or communication of at least one other component of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 includes a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage system resources (for example, the bus 110, the processor 120, or the memory 130) used for performing an operation or function implemented by the other programs (for example, the middleware 143, the API 145, or the applications 147). Furthermore, the kernel 141 may provide an interface through which the middleware 143, the API 145, or the applications 147 may access the individual elements of the electronic device 101 to control or manage the system resources.

The middleware 143 may serve as, for example, an intermediary for allowing the API 145 or the applications 147 to communicate with the kernel 141 to exchange data.

In addition, the middleware 143 may process one or more task requests received from the applications 147 according to priorities thereof. For example, the middleware 143 may assign priorities for using the system resources (for example, the bus 110, the processor 120, the memory 130, or the like) of the electronic device 101, to at least one of the applications 147. Additionally, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include, for example, at least one interface or function (for example, instruction) for file control, window control, image processing, or text control.

The input/output interface 150 may function as, for example, an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a liquid crystal display (LCD), a light-emitting diode (LED) display, an organic LED (OLED) display, a microelectromechanical systems (MEMS) display, and an electronic paper display. The display 160, for example, may display various types of contents (for example, text, images, videos, icons, or symbols) for the user. The display 160 may include a touch screen, and may receive, for example, a touch, gesture, proximity, or hovering input by using an electronic pen or a part of the user's body.

The communication interface 170 may set, for example, communication between the electronic device 101 and an external device (for example, a first external electronic device 102, a second external electronic device 104, or a server 106). For example, the communication interface 170 may be connected to a network 162 through wireless or wired communication to communicate with a second external electronic device 104 or a server 106).

The wireless communication may use at least one of, for example, long term evolution (LTE), LTE-advanced (LTE-A), code division multiple access (CDMA), wideband CDMA (WCDMA), universal mobile telecommunications system (UMTS), WiBro (Wireless Broadband), and global system for mobile communications (GSM), as a cellular communication protocol. In addition, the wireless communication may include, for example, short range communication 164. The short-range communication 164 may be performed by using at least one of, for example, Wi-Fi, Bluetooth, near field communication (NFC), and global navigation satellite system (GNSS). The GNSS may include at least one of, for example, a GPS, a global navigation satellite system (Glonass), a Beidou navigation satellite system (Beidou), and a European global satellite-based navigation system (Galileo), according to a use area, a bandwidth, or the like. Hereinafter, the "GPS" may be used interchangeably used with the "GNSS" in the present disclosure. The wired communication may include, for example, at least one of a universal serial bus (USB), a high definition multimedia interface (HDMI), Recommended Standard 232 (RS-232), and a plain old telephone service (POTS). The network 162 may include at least one of a communication network such as a computer network (for example, a LAN or a WAN), the Internet, and a telephone network.

Each of a first external electronic device 102 and the second external electronic device 104 may be of a type identical to or different from that of the electronic device 101. The server 106 may include a group of one or more servers. All or some of the operations performed in the electronic device 101 may be performed in another electronic device or a plurality of electronic devices (for example, the electronic devices 102 and 104 or the server 106). When the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device 102 or 104 or the server 106 may execute the requested functions or the additional functions, and may deliver a result of the execution to the electronic device 101. The electronic device 101 may process the received result as it is or additionally process the result to provide the requested functions or services. To achieve this, for example, cloud computing, distributed computing, or client-server computing technology may be used.

The processor 120 may process at least some of the information obtained from other components (for example, at least one of the memory 130, the input/output interface 150, and the communication interface 170) and utilize the same in various manners. For example, the processor 120 may control at least some functions of the electronic device 101 so that the electronic device 101 may interwork with other electronic devices 102 or 104 or the server 106. The processor 120 may be integrated with the communication interface 170. According to an embodiment, at least one component of the processor 120 may be included in the server 106 and at least one operation implemented by the processor 120 may be supported by the server 106.

According to an embodiment, the memory 130 may include instructions to operate the processor 120. For example, the memory 130 may include instructions for allowing the processor 120 to control other elements of the electronic device 101 and to interwork with other electronic devices 102 and 104 or the server 106. The processor 120 may control other components of the electronic device 101 and interwork with other electronic devices 102 and 104 or the server 106 based on the instructions stored in the memory 130. Hereinafter, the operations of the electronic device 101 will be described based on the respective components of the electronic device 101. Further, the instructions for allowing the receptive components to perform the operations may be included in the memory 130.

According to various embodiments of the present disclosure, the display 160 may display various objects. Hereinafter, the objects may include all graphic objects which can be displayed through the display such as text, images, dynamic images, icons, menus, and the like. Further, the objects may include a three dimensional graphic object displayed in three dimension.

According to various embodiments of the present disclosure, the input/output interface 150 may receive a first input related to a first object displayed through the display 160 from the user. The first input may include a touch, gesture, proximity, or hovering input using an electronic pen or a user's body part through the display 160 (for example, touch screen). Further, a point corresponding to the first input on the display 160 may be singular or plural. For example, when the first input is a touch input, a touch point through the user's body or another input means (for example, electronic pen) may be singular or plural. Further, when the first input is a gesture input or a hovering input, a point corresponding to the gesture or the hovering input may be singular or plural. As described above, all types of inputs which can be made through the input/output interface 160 may be used as the first input.

According to various embodiments of the present disclosure, the processor 120 may determine a speed of the first object that moves according to the received first input. The processor 120 may move the first object according to the first input and display the first object on the display 160. For example, when the user touches and selects the first object displayed on the display 160 and drags the first object in a right direction, the first object may move in the right direction corresponding to the drag action.

Further, the processor 120 may determine a movement direction of the first object that moves according to the first input. The processor 120 may determine the movement direction of the first object based on information on the first input.

According to various embodiments of the present disclosure, the processor 120 may compare the determined speed of the first object with a preset threshold. The threshold may be set according to a user's settings or characteristics of an application executed in the electronic device 101. The threshold may be used as a reference for determining an instruction corresponding to the first input. Further, the processor 120 may set a plurality of thresholds according to the user's settings or the characteristics of the application executed in the electronic device 101. Accordingly, the processor 120 may determine the instruction corresponding to the first input through a more subdivided reference.

According to various embodiments of the present disclosure, the processor 120 may determine the instruction corresponding to the first input based on a result of the comparison between the determined speed of the first object and the preset threshold. For example, when the speed of the first object is greater than or equal to the preset threshold, the processor 120 may determine the instruction corresponding to the first input as a first instruction. When the speed of the first object is less than the preset threshold, the processor 120 may determine the instruction corresponding to the first input as a second instruction.

For example, when the speed of the first object is greater than or equal to the threshold, the processor 120 may execute the instruction to not display the first object on the display 160. The processor 120 may execute the instruction to not display the first object on the display 160 by continuously moving the first object in an input direction of the first input according to the first input.

Further, when the speed of the first object is less than the threshold, the processor 120 may execute the instruction to display a second object indicating a menu related to the first object on the display 160.

As described above, the processor 120 may execute different instructions according to the result of the comparison between the first object and the preset threshold.

Further, when there are multiple preset thresholds, the processor 120 may determine the instruction corresponding to the first input by comparing the speed of the first object with each of the plurality of preset thresholds. For example, the processor 120 may determine the instruction corresponding to the first input as a first instruction when the speed of the first object is greater than or equal to a first threshold and a second threshold, determine the instruction corresponding to the first input as a second instruction when the speed of the first object is less than the first threshold and greater than or equal to the second threshold, and determine the instruction corresponding to the first input as a third instruction when the speed of the first object is less than the first threshold and the second threshold.

According to various embodiments, the processor 120 may further consider the movement direction of the first object in determining the instruction corresponding to the first input. In other words, the processor 120 may determine the instruction corresponding to the first input based on the result of the comparison between the first object and the preset threshold and the movement direction of the first object. For example, the processor 120 may determine the instruction corresponding to the first object as the first instruction when the speed of the first object is greater than or equal to the first threshold and the movement direction of the first object is a right direction, and determine the instruction corresponding to the first object as the second instruction when the speed of the first object is greater than or equal to the first threshold and the movement direction of the first object is a left direction.

Further, the instruction corresponding to the first input may be set according to each application executed in the electronic device 101, or differently set according to each application based on user's settings.

The processor 120 may execute the instruction determined to correspond to the first input. Accordingly, the user may control the electronic device 101 to execute a desired instruction by controlling at least one of the speed and the movement direction of the first object through the first input.

According to various embodiments of the present disclosure, the processor 120 may set a reference point or a reference line within the first object in order to determine the speed of the first object that moves according to the first input. The processor 120 may set the reference point or the reference line based on at least one of the movement direction of the first object and the application executed in the electronic device 101.

For example, when the movement direction of the first object is the right direction, the processor 120 may set a left side of the first object as the reference line, one point of the left side as the reference point, or a random point in a left area based on the center of the first object as the reference point. Further, when the first object can move only in up and down directions in the executed application, the processor 120 may set an upper side or a lower side of the first object as the reference point or set the reference line to horizontally pass through the center point of the first object. The present disclosure is not limited to a method of setting the reference point or the reference line. The processor 120 may set the reference point or the reference line through various methods in order to determine the speed of the first object.

According to various embodiments of the present disclosure, the processor 120 may calculate a movement distance and a movement time of the first object that has moved according to the first input, based on the set reference point or reference line. For example, the processor 120 may calculate the movement distance of the preset reference point or reference line according to the first input, and calculate the time spent to move the distance.

The processor 120 may determine the speed of the first object according to the calculated movement distance and movement time of the first object.

Further, the processor 120 may set a plurality of measurement lines or points to determine the speed of the first object and calculate the time when the preset reference point or reference line passes through the plurality of measurement lines or points according to the first input. Accordingly, the processor 120 may calculate the movement distance of the first object through a distance between the plurality of measurement lines or points and determine the speed of the first object. A method of determining the speed of the first object is described in greater detail below, and the speed of the first object may be determined through various methods using a change in a pixel value of the display 160.

According to various embodiments of the present disclosure, when the first input is a rotation instruction, the processor 120 may determine an angular speed of the first object that rotates according to the first input. When the first input is a rotation instructions for rotating the first object, the processor 120 may determine the angular speed of the first object, and set at least one reference line or reference point based on the center of the first object in order to determine the angular speed. The processor 120 may calculate a rotation direction, a rotation angle, and a rotation time of the first object by using the set reference line or reference point, and determine the angular speed of the first object by using the calculated rotation direction, rotation angle, and rotation time.

According to various embodiments of the present disclosure, when the first object is a three dimensional object, the processor 120 may determine whether there are multiple points within the first object corresponding to the first input as the first input is received. In order to distinguish whether the first input is an input for moving the three dimensional object or an instruction for rotating the three dimensional object, the processor 120 may determine whether there are multiple points within the first object corresponding to the first input. Since the three dimensional object may be rotated and displayed based on the central axis unlike a two dimensional object, the processor 120 may be required to distinguish whether the first input is an input for moving the three dimensional object or an instruction for rotating the three dimensional object.

For example, when the first object is the three dimensional object, the first object may move according to the first input when there are multiple points within the first object corresponding to the first input and rotate with respect to the central axis according to the first input when there is a single point within the first object corresponding to the first input. However, the present disclosure is not limited thereto.

Accordingly, when there are multiple points within the first object corresponding to the first input, the processor 120 may set at least one reference point or reference line within the first object to determine the speed of the first object. The processor 120 may calculate the movement distance and the movement time of the first object that has moved according to the first input based on the set reference point or reference line, and determine the speed of the first object based on the calculated movement distance and movement time.

Further, when there is a single point within the first object corresponding to the first input, the processor 120 may set at least one reference line in the same direction as the central axis of the first object to determine the angular speed of the first object. The processor 120 may calculate a rotation direction, rotation angle, and rotation time of the first object that has rotated according to the first input based on the reference line and determine the angular speed of the first object based on the calculated rotation direction, rotation angle, and rotation time.

The processor 120 may compare the determined speed or angular speed of the first object with a preset threshold, and execute an instruction corresponding to the first input determined based on a result of the comparison.

According to various embodiments of the present disclosure, the input/output interface 150 may receive a plurality of inputs, for example, a first input and a second input related to the first object displayed through the display 160 from the user. The first input and the second input may be inputs having different movement directions and different movement speeds. Hereinafter, although there are a plurality of corresponding points in one input, the points are considered as one input if movement directions are the same and movement speeds are the same, and the points are considered as separated inputs if the movement directions are different and the movement speeds are different.

According to various embodiments of the present disclosure, the processor 120 may determine speeds of a first point and a second point within the first object corresponding to the first input and the second input, respectively. A method of determining the speeds of the first point and the second point is the same as the method of determining the speed of the first object, which is described in greater detail below.

The processor 120 may compare the determined speeds of the first point and the second point with a preset threshold. The processor 120 may compare each of the speeds of the first point and the second point with the preset threshold, calculate an average speed by using the speeds of the first point and the second point, and compare the calculated average speed with the preset threshold.

Further, the processor 120 may determine a movement direction of each of the first point and the second point based on the first input and the second input, and may use instructions corresponding to the first input and the second input for determining the instructions.

The processor 120 may determine the instructions corresponding to the first input and the second input determined based on a result of the comparison and execute the determined instructions. Further, in determining the instructions corresponding to the first input and the second input, the processor 120 may further consider an input direction of each of the first input and the second input. The processor 120 may determine the instructions corresponding to the first input and the second input based on the result of the comparison between the speeds of the first point and the second point with the preset threshold and the input direction of each of the first point and the second point. The processor 120 may execute the determined instructions.

Figure 2:
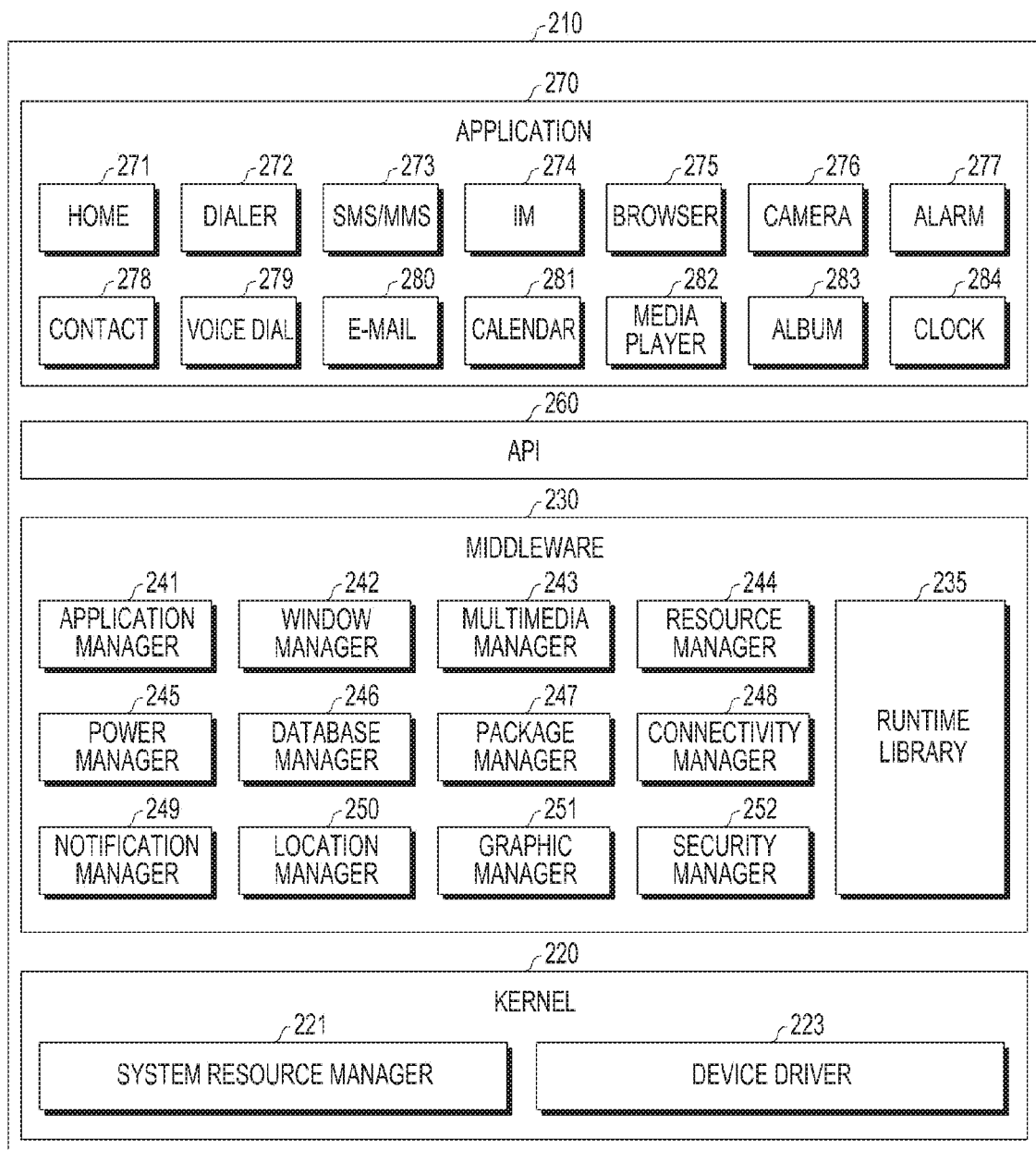
FIG. 2 is a block diagram illustrating a program module, according to an embodiment of the present disclosure.

FIG. 2 is a block diagram illustrating a program module, according to an embodiment of the present disclosure. A program module 210 (for example, the program 140) may include an operating system (OS) for controlling resources related to the electronic device (for example, the electronic device 101) and/or various applications (for example, the applications 147) executed in the operating system.

The program module 210 includes a kernel 220, middleware 230, an API 260, and applications 270. At least some of the program module 210 may be preloaded on the electronic device, or may be downloaded from an external electronic device 102 or 104, or the server 106.

The kernel 220 (for example, the kernel 141) includes a system resource manager 221 and/or a device driver 223. The system resource manager 221 may control, assign, or collect system resources. According to an embodiment, the system resource manager 221 may include a process manager, a memory manager, or a file system manager. The device driver 223 may include, for example, a display driver, a camera driver, a Bluetooth driver, a shared memory driver, a USB driver, a keypad driver, a Wi-Fi driver, an audio driver, or an inter-process communication (IPC) driver.

The middleware 230 may provide a function required by the applications 270 in common or provide various functions to the applications 270 through the API 260 so that the applications 270 can efficiently use limited system resources within the electronic device. According to an embodiment, the middleware 230 (for example, the middleware 143) includes at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include, for example, a library module that a compiler uses in order to add new functions through a programming language while the applications 270 are executed. The runtime library 235 may perform input/output management, memory management, or a function for an arithmetic function.

The application manager 241 may, for example, manage a life cycle of at least one of the applications 270. The window manager 242 may manage graphical user interface (GUI) resources used on a screen. The multimedia manager 243 may identify formats required for the reproduction of various media files and encode or decode a media file using a codec suitable for the corresponding format. The resource manager 244 may manage resources of at least one of the applications 270, such as a source code, a memory, and a storage space.

The power manager 245 may operate together with, for example, a basic input/output system (BIOS) to manage a battery or power and may provide power information required for the operation of the electronic device. The database manager 246 may generate, search, or change a database to be used in at least one of the applications 270. The package manager 247 may manage the installation or the updating of an application distributed in the form of a package file.

The connectivity manager 248 may manage a wireless connection such as, for example, Wi-Fi or Bluetooth. The notification manager 249 may display or notify of an event, such as an arrival message, an appointment, proximity notification, and the like, in such a manner of not disturbing a user. The location manager 250 may manage location information of the electronic device. The graphic manager 251 may manage a graphic effect to be provided to a user and a user interface relating to the graphic effect. The security manager 252 may provide all security functions required for system security or user authentication. According to an embodiment, when the electronic device 101 has a telephone call function, the middleware 230 may further include a telephony manager for managing a voice call function or a video call function of the electronic device.

The middleware 230 may include a middleware module that forms combinations of various functions of the above described elements. The middleware 230 may provide specialized modules according to types of operating systems in order to provide differentiated functions. Furthermore, the middleware 230 may dynamically remove some of the existing elements, or may add new elements.

The API 260 (for example, the API 145) is, for example, a set of API programming functions, and may be provided with a different configuration according to an OS. For example, one API set may be provided for each platform, and in the case of Tizen, two or more API sets may be provided for each platform.

The applications 270 (for example, the applications 147) includes, for example, one or more applications that can perform functions, such as home 271, dialer 272, short message service/multimedia messaging service (SMS/MMS) 273, instant messaging (IM) 274, browser 275, camera 276, alarm 277, contacts 278, voice dial 279, e-mail 280, calendar 281, media player 282, album 283, clock 284, health care (for example, measure exercise quantity or blood sugar), or environment information (for example, atmospheric pressure, humidity, temperature information or the like).

According to an embodiment, the applications 270 may include an information exchange application supporting information exchange between the electronic device 101 and an external electronic device 102 or 104. The information exchange application may include, for example, a notification relay application for transferring specific information to an external electronic device or a device management application for managing an external electronic device.

For example, the notification relay application may include a function of transferring, to the external electronic device 102 or 104, notification information generated from other applications of the electronic device 101 (for example, an SMS/MMS application, an e-mail application, a health management application, or an environmental information application). Further, the notification relay application may receive notification information from, for example, an external electronic device and provide the received notification information to a user.

The device management application may manage (for example, install, delete, or update), for example, at least one function of an external electronic device 102 or 104 communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an embodiment, the applications 270 may include applications (for example, a health care application of a mobile medical appliance or the like) designated according to attributes of the first or second external electronic device 102 or 104. The applications 270 may include an application received from the external electronic device (for example, the server 106, or the first or second external electronic device 102 or 104). The applications 270 may include a preloaded application or a third party application which can be downloaded from the server. Names of the elements of the program module 210, according to the above-described embodiments of the present disclosure, may change depending on the type of OS.

According to various embodiments of the present disclosure, at least some of the program module 210 may be implemented in software, firmware, hardware, or a combination of two or more thereof. At least some of the program module 210 may be implemented (e.g., executed) by, for example, the processor 120. At least some of the program module 210 may include, for example, a module, a program, a routine, a set of instructions, and/or a process for performing one or more functions.

Figure 3:
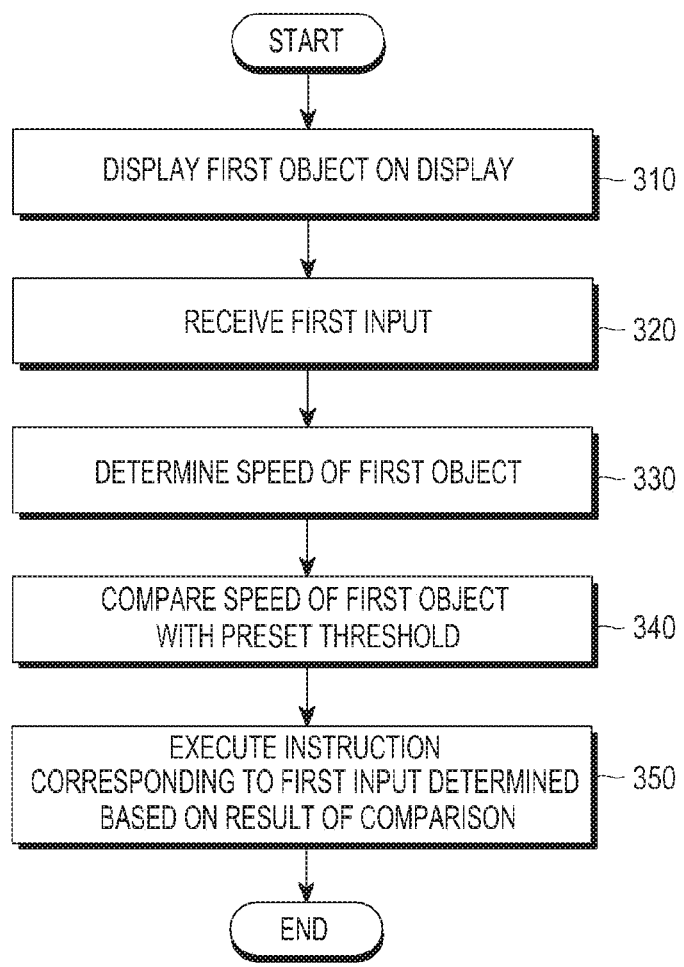
FIG. 3 is a flowchart illustrating a method of processing an input by the electronic device, according to an embodiment of the present disclosure.

FIG. 3 is a flowchart illustrating a method of processing an input by the electronic device, according to an embodiment of the present disclosure.

In step 310, the electronic device 101 displays a first object on the display (for example, the display 160). According to user's settings or an executed application, the first object displayed through the display may be determined.

In step 320, the electronic device 101 receives a first input related to the first object displayed through the display 160 from the user. The first input may include a touch, gesture, proximity, or hovering input using an electronic pen or a user's body part through the display 160 (for example, a touch screen).

In step 330, the electronic device 101 determines a speed of the first object that moves according to the received first input. Further, the electronic device 101 may determine a movement direction of the first object that moves according to the first input. A method of determining the speed and a movement direction of the first object is described in greater detail below.

In step 340, the electronic device 101 compares the determined speed of the first object with a preset threshold. The threshold may be set by the user or set according to characteristics of an application executed in the electronic device 101. The threshold may be used as a reference for determining an instruction corresponding to the first input.

In step 350, the electronic device 101 determines an instruction corresponding to the first input based on a result of the comparison between the determined speed of the first object and the preset threshold. Further, in determining the instruction corresponding to the first input, the electronic device 101 may further consider the movement direction of the first object.

Figure 4:
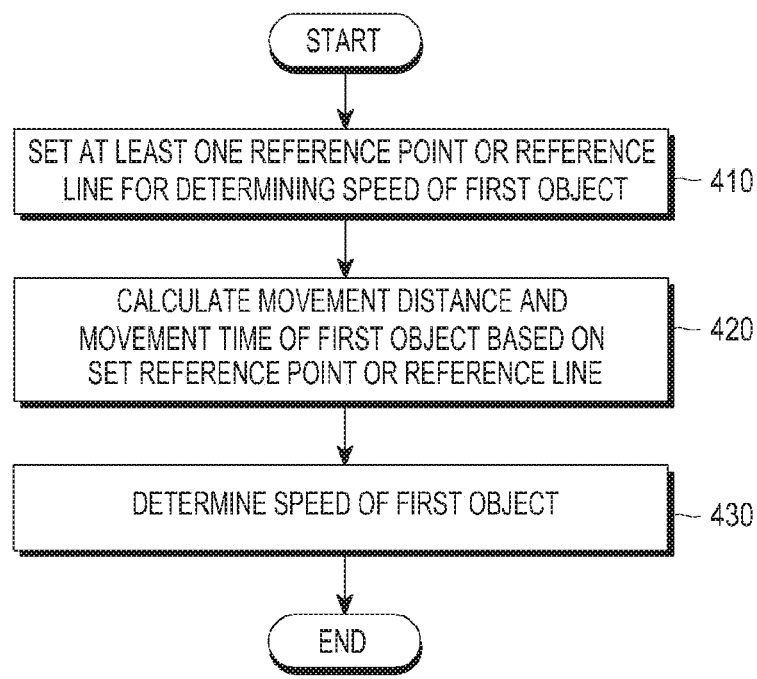
FIG. 4 is a flowchart illustrating a method of determining a speed of an object by the electronic device, according to an embodiment of the present disclosure.

FIG. 4 is a flowchart illustrating a method of determining the speed of the object by the electronic device, according to an embodiment of the present disclosure.

In step 410, the electronic device 101 sets at least one reference point or reference line to determine the speed of the first object that moves according to the first input. The electronic device 101 may set the reference point or the reference line within the first object and set the reference point or the reference line that is not within the first object.

The electronic device 101 may set the reference point or the reference line based on at least one of the movement direction of the first object and the application executed in the electronic device 101.

In step 420, the electronic device 101 calculates a movement distance and a movement time of the first object by using the set reference point or reference line. For example, the processor 120 may calculate the movement distance of the preset reference point or reference line according to the first input and calculate the time spent to move the distance.

Further, the electronic device 101 may set a plurality of measurement lines or points to determine the speed of the first object and calculate a time when the preset reference point or reference line passes the plurality of measurement lines or points and the movement distance according to the first input.

In step 430, the electronic device 101 determines the speed of the first object according to the calculated movement distance and movement time of the first object.

FIGS. 5A to 5D are diagrams illustrating a method of processing an input in a left direction by the electronic device, according to an embodiment of the present disclosure.

Figure 5A:
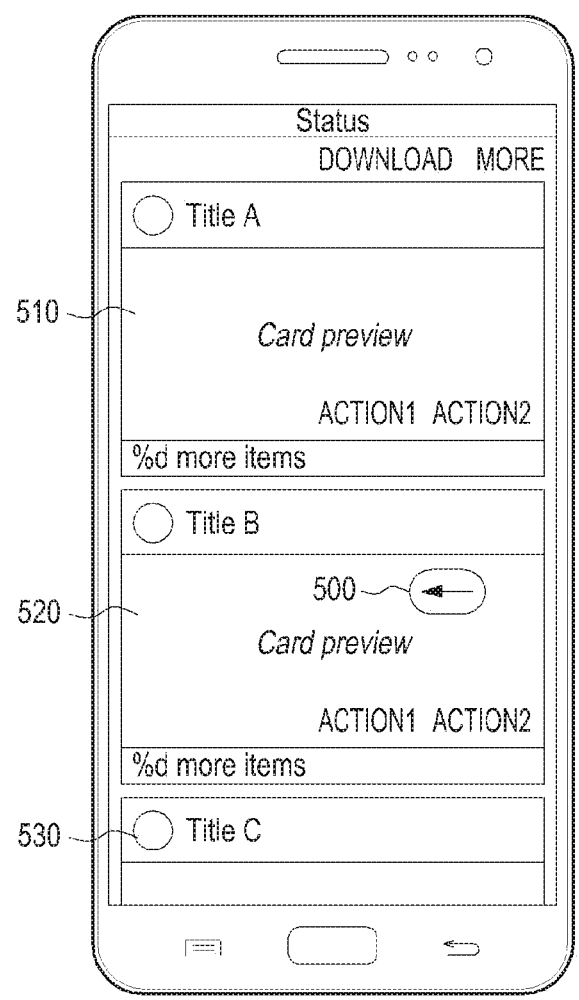
FIGS. 5A to 5D are diagrams illustrating a method of processing an input in a left direction by the electronic device, according to an embodiment of the present disclosure.

According to various embodiments of the present disclosure, the electronic device 101 may determine objects displayed on the display according to an executed application. FIG. 5A illustrates an execution screen of an application for managing a card in the electronic device 101. According to execution of the application, the electronic device 101 displays a first object 510 for displaying information related to a first card registered in the application, a second object 520 for displaying information related to a second card, and a third object 530 for displaying information related to a third card on the display.

Hereinafter, a method will be described by which the electronic device 101 processes a first input 500 in a left direction as the first input 500 in the left direction related to the second object 520 is received.

Figure 5B:
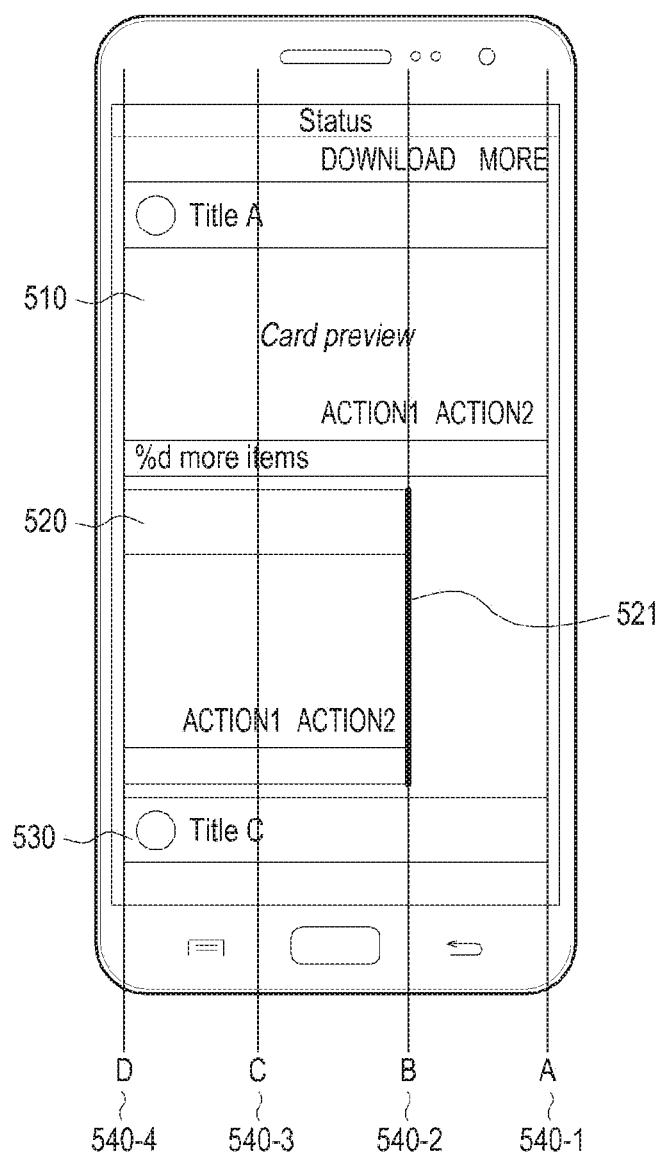

As illustrated in FIG. 5B, the second object 520 may move in a left direction according to the first input 500 in the left direction. The electronic device 101 may determine a speed of the second object 520 that moves in the left direction. For example, the electronic device 101 may set a right side of the second object 520 as a reference line 521 in order to determine the speed of the second object 520. However, this is only for the description, and a random line or point within the second object 520 may be set as a reference line or a reference point for calculating the speed.

The electronic device 101 may calculate a movement distance and a movement time of the second object 520 by using the set reference line 521 and determine a speed of the second object 520 through the calculated movement distance and movement time. Further, the electronic device 101 may determine a movement direction of the second object 520 based on the movement direction of the first input 500. For example, as illustrated in FIG. 5B, since the movement direction of the first input 500 is a left direction and the second object 520 moves in the same direction as the movement direction of the first input 500 according to the first input 500, the electronic device 101 may determine the movement direction of the second object 520 as the left direction.

Further, as illustrated in FIG. 5B, the electronic device 101 may set four measurement lines 540-1, 540-2. 540-3, and 540-4 for determining the speed of the second object 520. Accordingly, the electronic device 101 may determine the speed of the reference line 521 moving from measurement line A 540-1 to measurement B 540-2. For example, the electronic device 101 may calculate the movement time of the reference line 521 from measurement line A 540-1 to measurement B 540-2, determine the speed of the reference line 521 based on a distance between measurement line A 540-1 and measurement B 540-2 and the calculated movement time, and determine the speed of the reference line 521 as the speed of the second object 520.

Figure 5C:
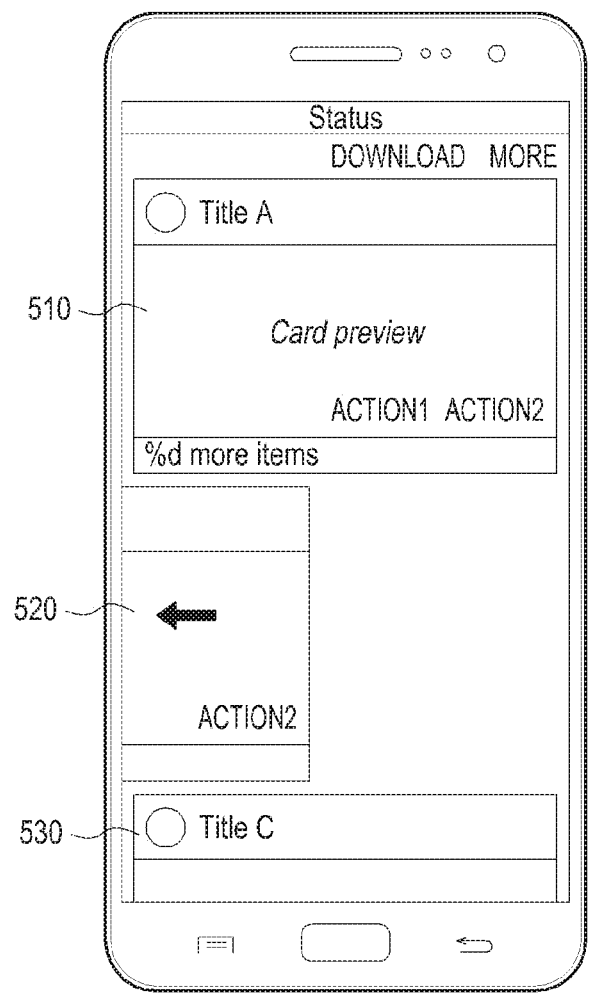

Referring to FIG. 5C, when the determined speed of the second object 520 is greater than or equal to a preset threshold, the electronic device 101 may not display the second object 520 while continuously moving the second object 520 in the left direction corresponding to the movement direction of the first input 500.

For example, the electronic device 101 may make the second object 520 disappear by continuously moving the second object 520 in the left direction while performing dim processing. Accordingly, the second object 520 may not be displayed on the display. Further, when the determined speed of the second object 520 is greater than or equal to the preset threshold, the electronic device 101 may not only prevent the second object 520 from being displayed on the display but also delete information on a second card corresponding to the second object 520 from the application according to the application being executed or user's settings.

Figure 5D:
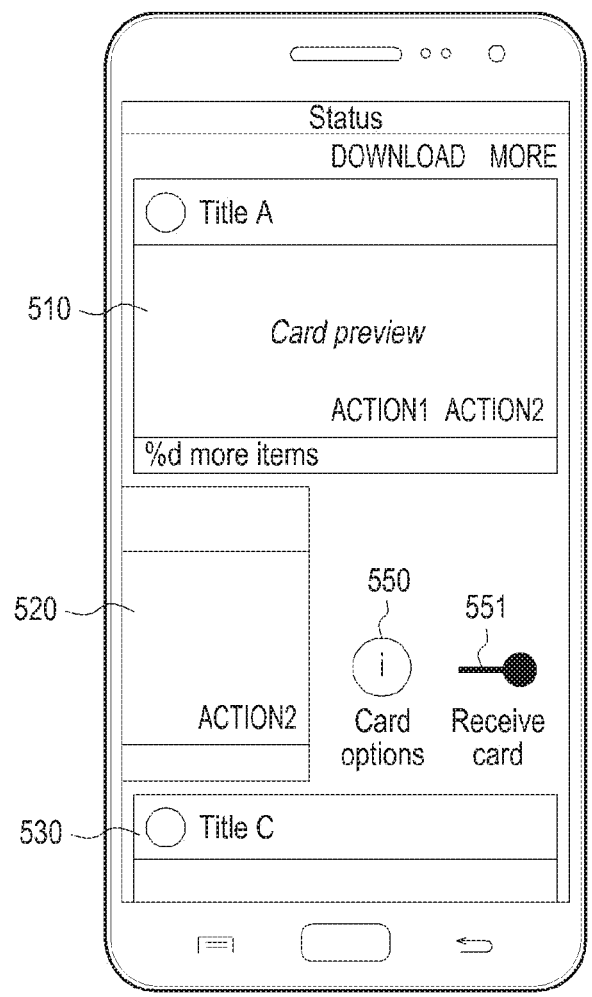

Referring to FIG. 5D, when the determined speed of the second object 520 is less than the preset threshold, the electronic device 101 may display fourth objects 550 and 551 indicating menus related to the second object 520. The fourth objects 550 and 551 may indicate the menus related to the second object 520, such as a menu for displaying information on the second card corresponding to the second object 520 and a menu for receiving further information on the second card.

As described above, the electronic device 101 may determine an instruction corresponding to the first input 500 according to the speed of the second object 520 that moves according to the first input 500 in the left direction, and may execute the determined instruction.

FIGS. 6A to 6D are diagrams illustrating a method of processing an input in a right direction by the electronic device, according to an embodiment of the present disclosure.

Figure 6A:
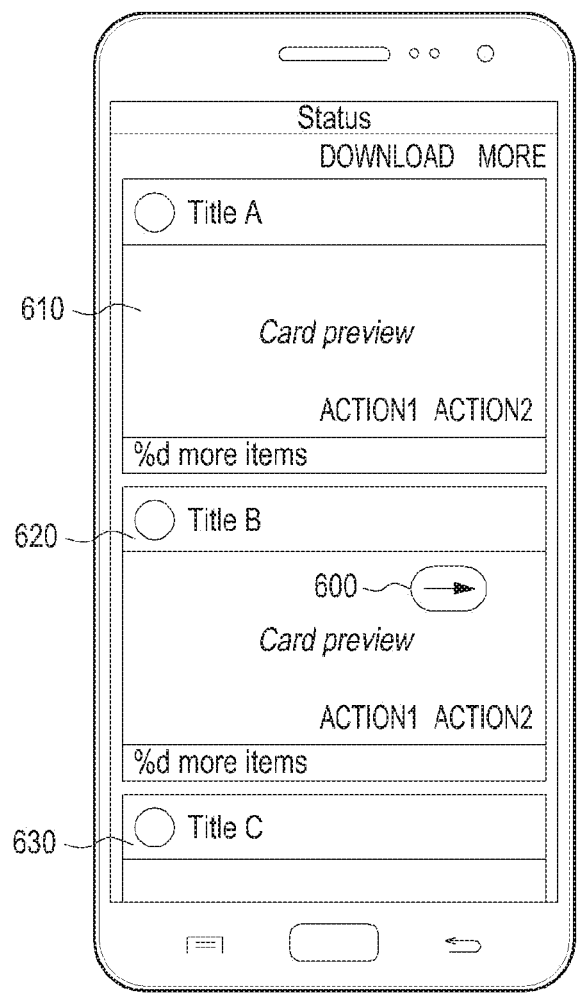
FIGS. 6A to 6D are diagrams illustrating a method of processing an input in a right direction by the electronic device, according to an embodiment of the present disclosure.

FIG. 6A illustrates an execution screen of an application for managing a card in the electronic device 101, similar to FIG. 5A. According to execution of the application, the electronic device 101 may display a first object 610 for displaying information related to a first card registered in the application, a second object 620 for displaying information related to a second card, and a third object 630 for displaying information related to a third card on the display Hereinafter, a method will be described by which the electronic device 101 processes a first input 600 in a right direction, according to reception of the first input 600 in the right direction related to the second object 620.

Figure 6B:
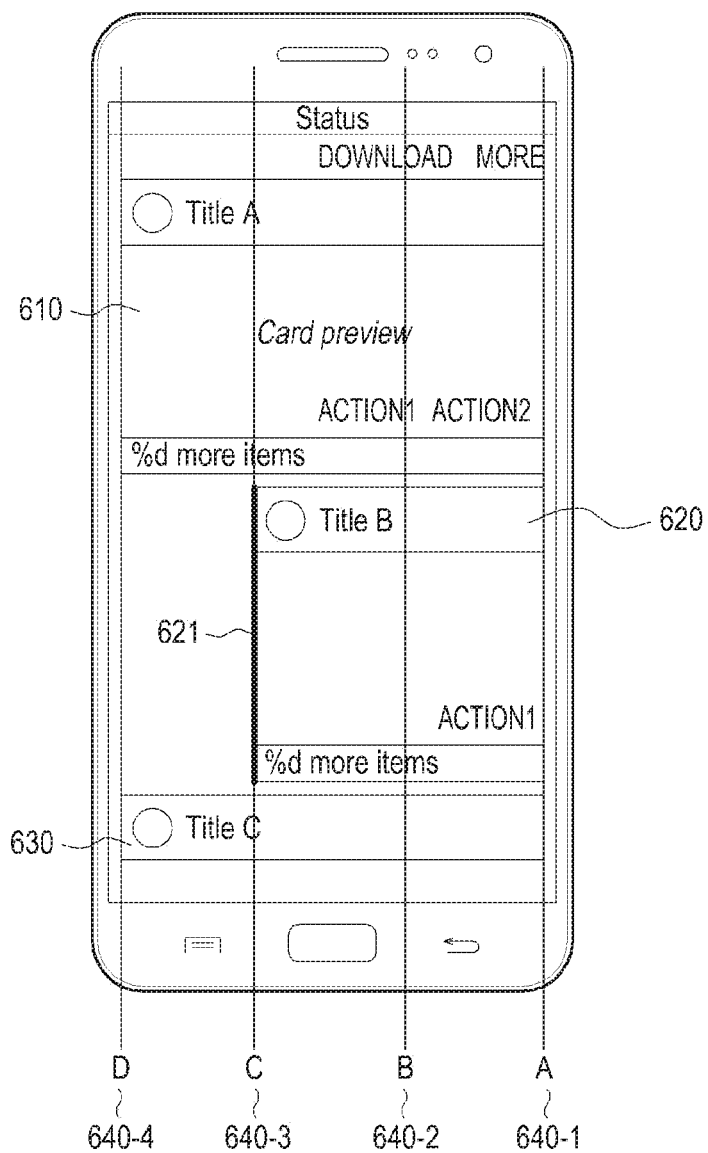

As illustrated in FIG. 6B, the second object 620 moves in a right direction according to the first input 600 in the right direction. The electronic device 101 may determine a speed of the second object 620 moving in the right direction. For example, in order to determine the speed of the second object 620, the electronic device 101 may set a left side of the second object 620 as a reference line 621. However, this is only for the description, and a random line or point within the second object 620 may be set as a reference line or a reference point for calculating the speed.

The electronic device 101 may calculate a movement distance and a movement time of the second object 620 by using the set reference line 621 and determine a speed of the second object 620 through the calculated movement distance and movement time. Further, the electronic device 101 may determine a movement direction of the second object 620 based on the movement direction of the first input 600. For example, as illustrated in FIG. 6B, since the movement direction of the first input 600 is the right direction and the second object 620 moves in the same direction as the movement direction of the first input according to the first input 600, the electronic device 101 may determine the movement direction of the second object 620 as the right direction.

Further, as illustrated in FIG. 6B, the electronic device 101 sets four measurement lines 640-1, 640-2. 640-3, and 640-4 for determining the speed of the second object 620. Accordingly, the electronic device 101 may determine the speed of the reference line 621 moving from measurement line D 640-4 to measurement line C 640-3. For example, the electronic device 101 may calculate a movement time of the reference line 621 from measurement line D 640-4 to measurement line C 640-3, determine the speed of the reference line 621 based on a distance between measurement line D 640-4 and measurement line C 640-3 and the calculated movement time, and determine the speed of the reference line 621 as the speed of the second object 620.

Figure 6C:
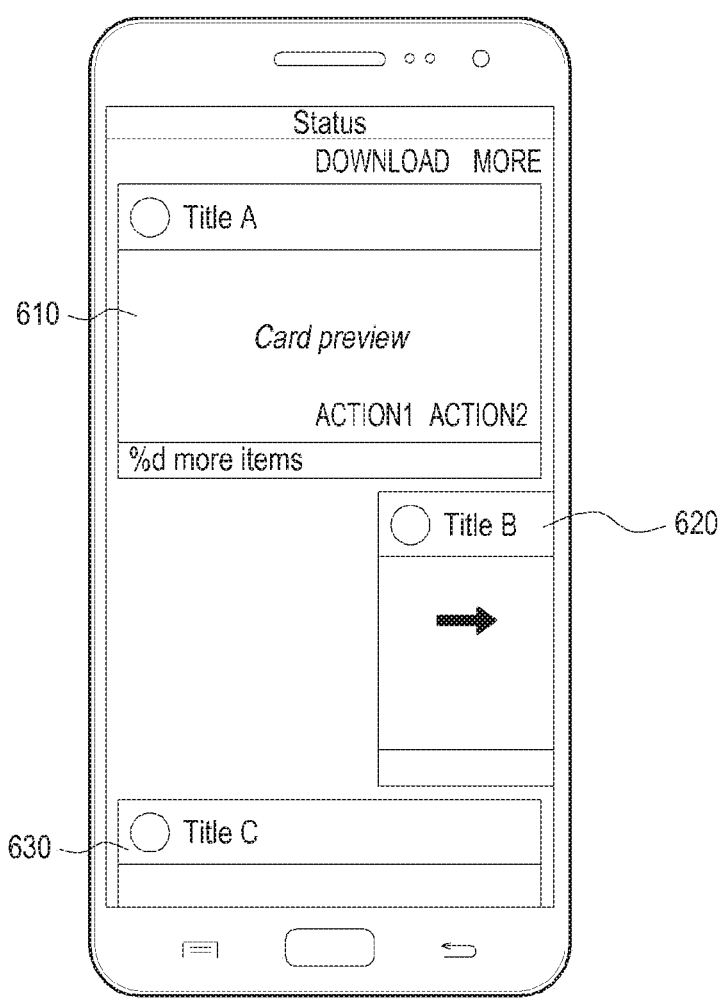

Referring to FIG. 6C, when the determined speed of the second object 620 is greater than or equal to a preset threshold, the electronic device 101 does not display the second object 620 while continuously moving the second object 620 in the right direction corresponding to the movement direction of the first input 600.

For example, the electronic device 101 may make the second object 620 disappear by continuously moving the second object 620 in the right direction while performing dim processing. Accordingly, the second object 620 may not be displayed on the display. Further, when the determined speed of the second object 620 is greater than or equal to the preset threshold, the electronic device 101 may not only prevent the second object 620 from being displayed on the display, but may also transmit information on a second card corresponding to the second object 620 in the application to another electronic device of the user, according to the application being executed or a user's settings. In this process, the electronic device 101 may further request information for a user's authentication before transmitting the information on the second card.

Figure 6D:
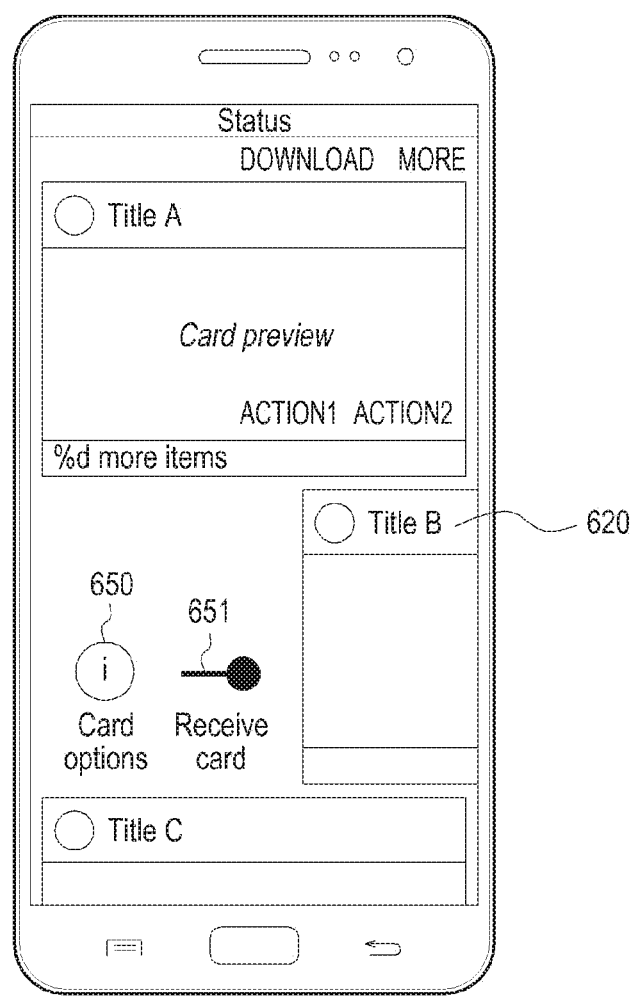

Referring to FIG. 6D, when the determined speed of the second object 620 is less than the preset threshold, the electronic device 101 displays fourth objects 650 and 651 indicating menus related to the second object 620. The fourth objects 650 and 651 may indicate the menus related to the second object 620, such as a menu for displaying information on the second card corresponding to the second object 620 and a menu for receiving further information on the second card.

As described above, the electronic device 101 may determine an instruction corresponding to the first input 600 according to the speed of the second object 620 that moves according to the first input 600 in the left direction and execute the determined instruction.

FIGS. 7A to 7E are diagrams illustrating a method of processing an input in an up and/or down direction by the electronic device, according to an embodiment of the present disclosure.

Figure 7A:
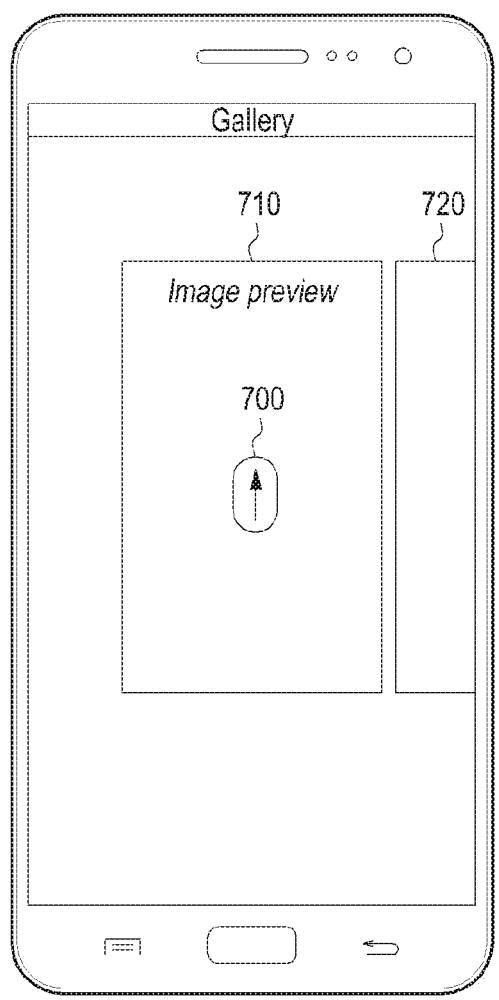
FIGS. 7A to 7E are diagrams illustrating a method of processing an input in an up and/or down direction by the electronic device, according to an embodiment of the present disclosure.

FIG. 7A illustrates an execution screen of an image viewer application in the electronic device 101. The electronic device 101 displays a first object 710 indicating a first image stored in the electronic device 101, and a second object 720 indicating a second image according to execution of the image viewer application.

Hereinafter, a method will be described in which the electronic device 101 processes a first input 700 in an up direction, according to reception of the first input 700 in the up direction related to the first object 710.

Figure 7B:
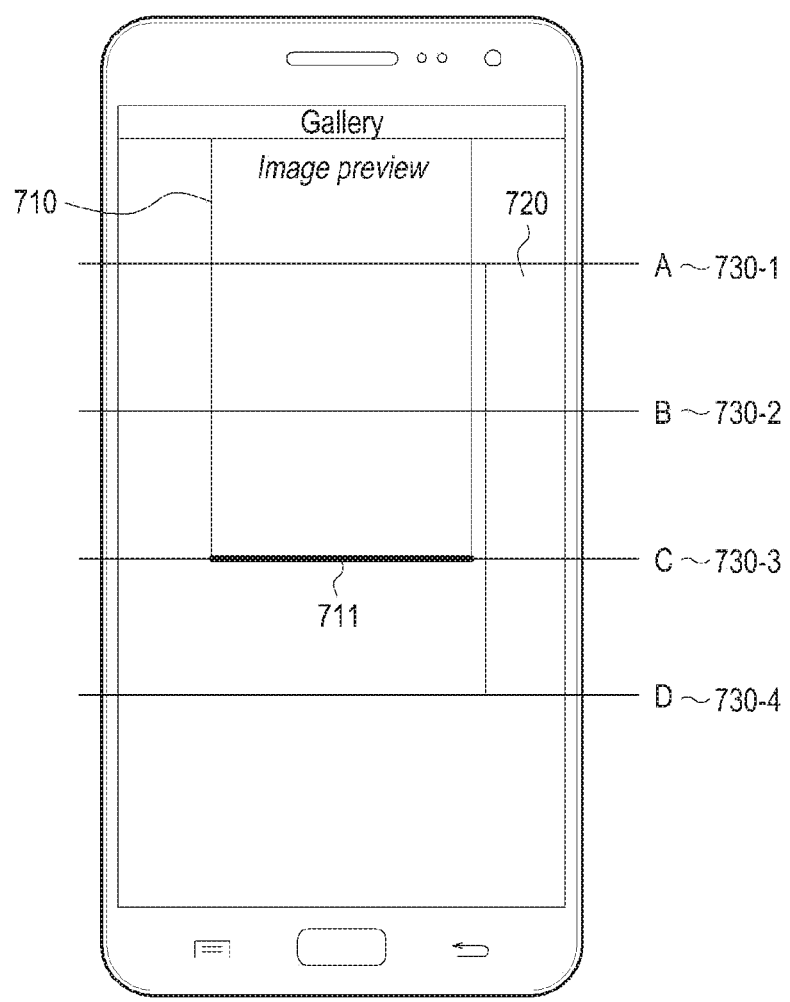

As illustrated in FIG. 7B, the first object 710 moves in an up direction according to the first input 700 in the up direction. The electronic device 101 may determine a speed of the first object 710 that moves in the up direction according to the first input 700. For example, in order to determine the speed of the first object 710, the electronic device 101 may set a lower side of the first object 710 as a reference line 711. However, a random line or point within the first object 710 may be set as a reference line or a reference point for calculating the speed.

The electronic device 101 may calculate a movement distance and a movement time of the first object 710 by using the set reference line 711, and may determine a speed of the first object 710 through the calculated movement distance and movement time. Further, the electronic device 101 may determine a movement direction of the first object 710 based on the movement direction of the first input 700. For example, as illustrated in FIG. 7B, since the movement direction of the first input 700 is the up direction and the first object 710 moves in the same direction as the movement direction of the first input 700 according to the first input 700, the electronic device 101 may determine that the movement direction of the first object 710 as the up direction.

Further, as illustrated in FIG. 7B, the electronic device 101 sets four measurement lines 730-1, 730-2. 730-3, and 730-4 for determining the speed of the first object 710. Accordingly, the electronic device 101 may determine the speed of the reference line 711 moving from measurement line D 730-4 to measurement line B 730-3. For example, the electronic device 101 may calculate a movement time of the reference line 711 from measurement line D 730-4 to measurement line C 730-3, determine the speed of the reference line 711 based on a distance between measurement line D 730-4 and measurement line C 730-3 and the calculated movement time, and determine the speed of the reference line 711 as the speed of the first object 710.

Further, even when the first object 710 moves in a down direction according to a second input in a down direction, the electronic device 101 may determine the speed of the first object 710 in the same way described above. For example, the electronic device 101 may determine the movement speed of the reference line 711 from measurement line A 730-1 to measurement line B 730-2. The electronic device 101 may calculate a movement time of the reference line 711 from measurement line A 730-1 to measurement line B 730-2, determine the speed of the reference line 711 based on a distance between measurement line A 730-1 and measurement line B 730-2 and the calculated movement time, and determine the speed of the reference line 711 as the speed of the first object 710.

Figure 7C:
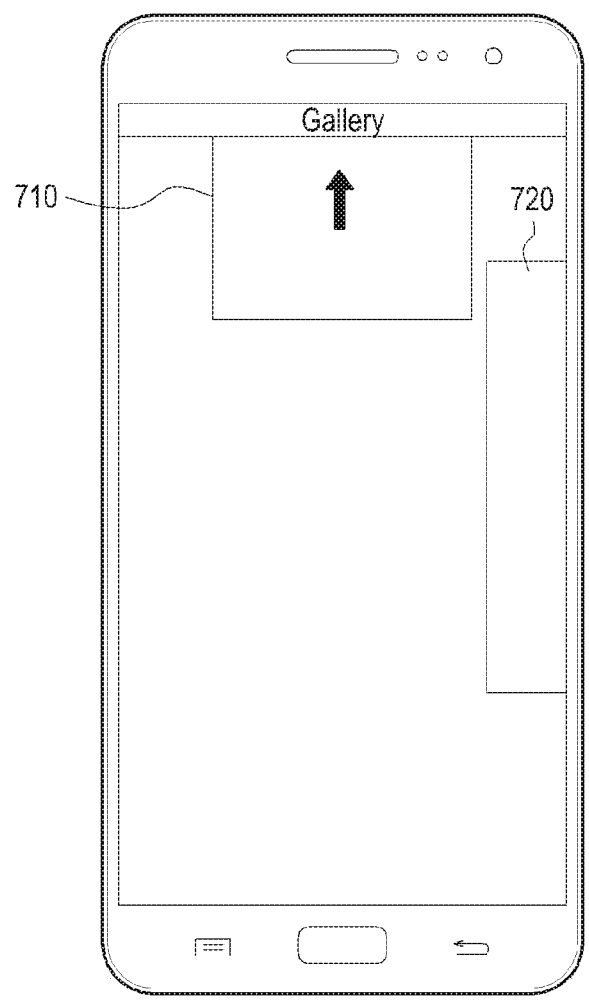

Referring to FIG. 7C, when the determined speed of the first object 710 is greater than or equal to a preset threshold, the electronic device 101 does not display the first object 710 while continuously moving the first object 710 in the up direction corresponding to the movement direction of the first input 700.

For example, the electronic device 101 may make the first object 710 disappear by continuously moving the first object 710 in the up direction while performing dim processing. Accordingly, the first object 710 may not display the first object 710 on the display.

Further, when the speed of the first object 710 is greater than or equal to the preset threshold, the electronic device 101 may not only prevent the first object 710 from being displayed on the display but also may delete the first image corresponding to the first object 710 or perform an additional operation of transmitting the first image to another electronic device or attaching the first image to an email.

Figure 7D:
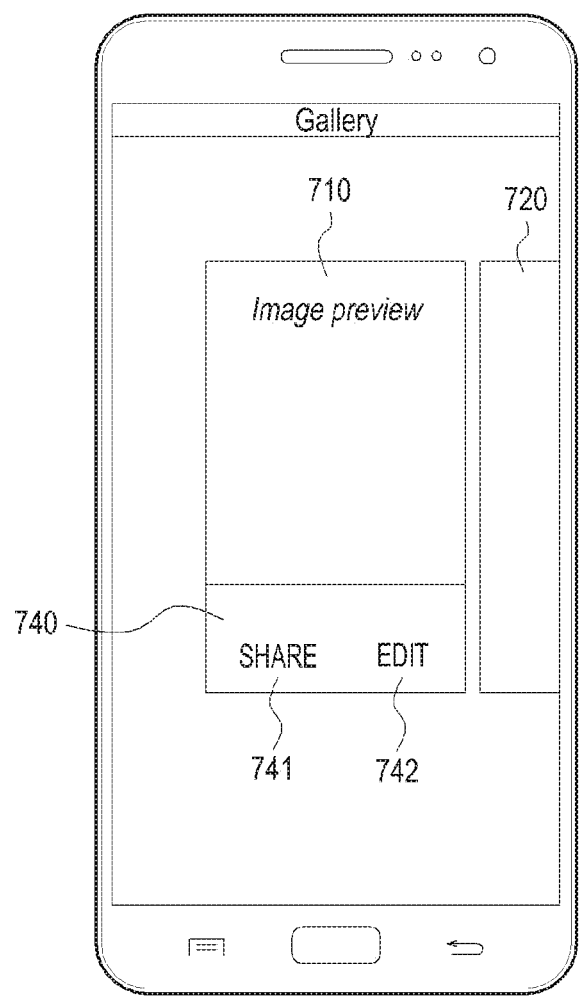

Referring to FIG. 7D, when the determined speed of the first object 710 is less than the preset threshold, the electronic device 101 displays a third object 740 indicating a menu related to the first object 710. The third object 740 may indicate the menu related to the first object 710, such as a menu for sharing or editing the first image corresponding to the first object 710.

Figure 7E:
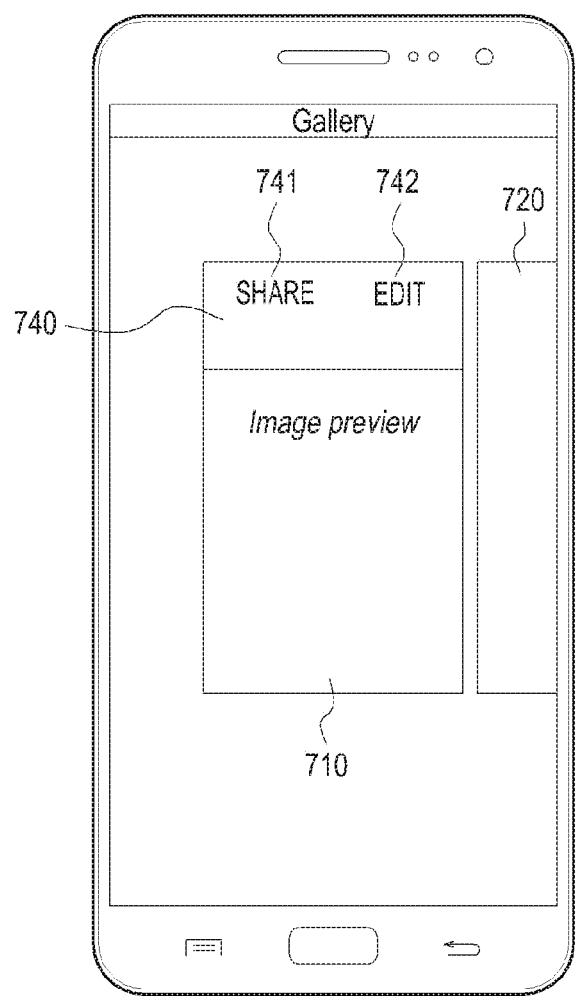

Further, the third object 740 may be displayed on a lower end of the first object 710, as illustrated in FIG. 7D, or may be displayed on an upper end of the first object 710, as illustrated in FIG. 7E, according to the movement direction of the first object 710. For example, when the movement direction of the first object 710 is the up direction, the third object 740 may be displayed on the lower end of the first object 710. When the movement direction of the first object 710 is the down direction, the third object 740 may be displayed on the upper end of the first object 710.

As described above, the electronic device 101 may determine an instruction corresponding to the first input 700, according to the speed of the first object 710 that moves according to the first input 700 in the up direction and execute the determined instruction.

FIGS. 8A to 8E are diagrams illustrating a method of processing an input in an up and/or down direction by the electronic device, according to an embodiment of the present disclosure.

Figure 8A:
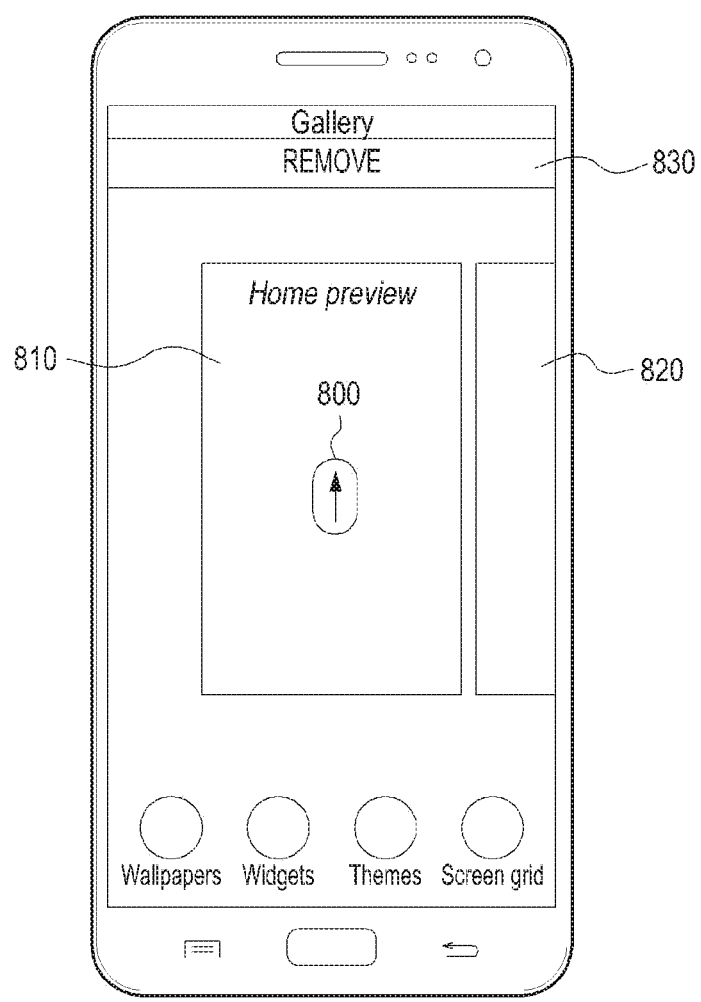
FIGS. 8A to 8E are diagrams illustrating a method of processing an input in an up and/or down direction by the electronic device, according to an embodiment of the present disclosure.

FIG. 8A illustrates an execution screen of an application for editing a home screen in the electronic device 101. The electronic device 101 displays a first object 810 indicating a first home screen set on the electronic device 101, and a second object 820 indicating a second home screen according to execution of the application. Each of the first object 810 and the second object 820 may include objects indicating at least one icon included in each of the first home screen and the second home screen. Further, according to the execution of the application, the electronic device 101 may display an object 830 indicating a menu for deleting a home screen selected according to a user's input between the set home screens. The object 830 may be displayed in a bar type, as illustrated in FIG. 8A, or a trash bin shape.

Hereinafter, a method is described in which the electronic device 101 processes a first input 800 in an up direction according to reception of the first input 800 in the up direction related to the first object 810.

Figure 8B:
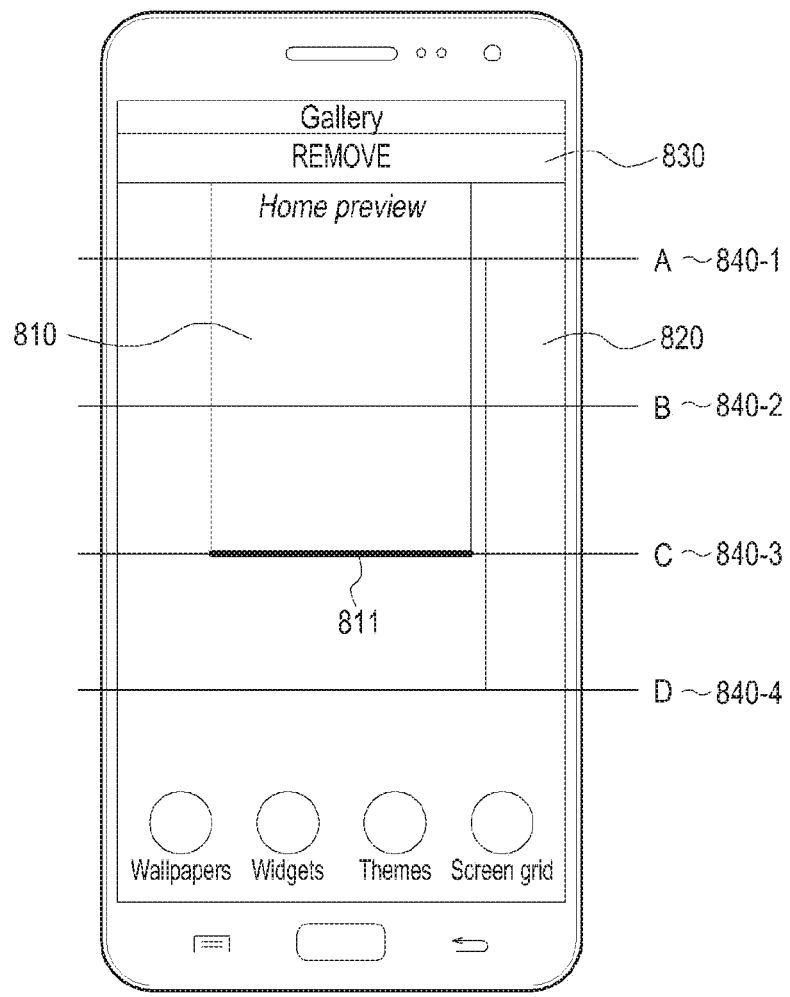

As illustrated in FIG. 8B, the first object 810 moves in an up direction according to the first input 800 in the up direction. The electronic device 101 may determine a speed of the first object 810 that moves in the up direction according to the first input 800. For example, in order to determine the speed of the first object 810, the electronic device 101 may set a lower side of the first object 810 as a reference line 811. However, a random line or point within the first object 810 may be set as a reference line or a reference point for calculating the speed.

The electronic device 101 may calculate a movement distance and a movement time of the first object 810 by using the set reference line 811, and may determine a speed of the first object 810 through the calculated movement distance and movement time. Further, the electronic device 101 may determine a movement direction of the first object 810 based on the movement direction of the first input 800. For example, as illustrated in FIG. 8B, since the movement direction of the first input 810 is the up direction and the first object 810 moves in the same direction as the movement direction of the first input 800 according to the first input 800, the electronic device 101 may determine that the movement direction of the first object 810 as the up direction.

Further, as illustrated in FIG. 8B, the electronic device 101 sets four measurement lines 840-1, 840-2. 840-3, and 840-4 for determining the speed of the first object 810. Accordingly, the electronic device 101 may determine the speed of the reference line 811 moving from measurement line D 840-4 to measurement line B 840-3. For example, the electronic device 101 may calculate a movement time of the reference line 811 from measurement line D 840-4 to measurement line C 840-3, determine the speed of the reference line 811 based on a distance between measurement line D 840-4 and measurement line C 840-3 and the calculated movement time, and determine the speed of the reference line 811 as the speed of the first object 810.

Further, even when the first object 810 moves in a down direction according to a second input in a down direction, the electronic device 101 may determine the speed of the first object 810 in the same manner described above. For example, the electronic device 101 may determine the movement speed of the reference line 811 from measurement line A 840-1 to measurement line B 840-2. The electronic device 101 may calculate a movement time of the reference line 811 from measurement line A 840-1 to measurement line B 840-2, determine the speed of the reference line 811 based on a distance between from measurement line A 840-1 to measurement line B 840-2 and the calculated movement time, and determine the speed of the reference line 811 as the speed of the first object 810.

Figure 8C:
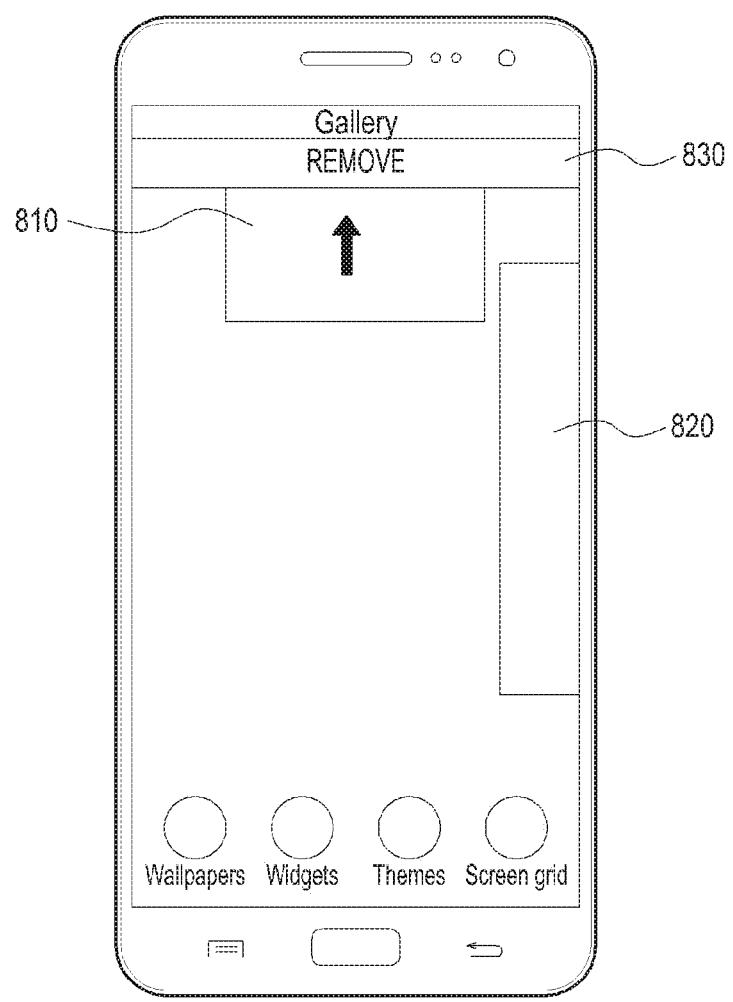

Referring to FIG. 8C, when the determined speed of the first object 810 is greater than or equal to a preset threshold, the electronic device 101 does not display the first object 810 while continuously moving the first object 810 in the up direction corresponding to the movement direction of the first input 800.

For example, the electronic device 101 may make the first object 810 disappear by continuously moving the first object 810 in the up direction while performing dim processing. Accordingly, the first object 810 may not display the first object 810 on the display.

Further, when the speed of the first object 810 is greater than or equal to the preset threshold, the electronic device 101 may not only prevent the first object 810 from being displayed on the display, but may also delete the first home screen corresponding to the first object 810.

Figure 8D:
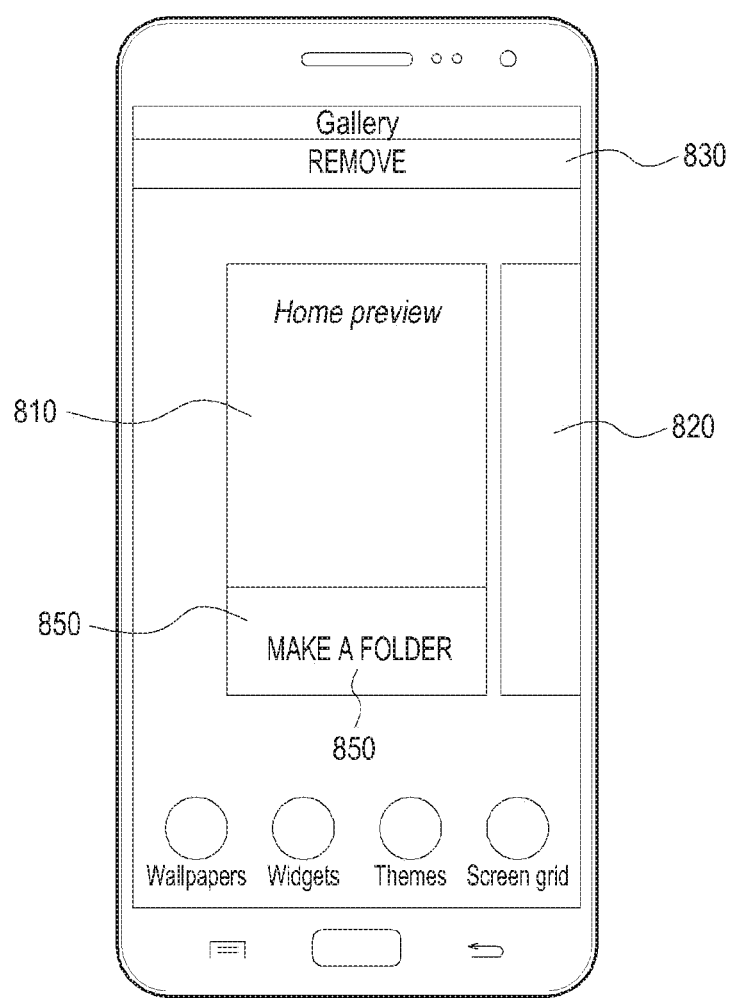

Referring to FIG. 8D, when the determined speed of the first object 810 is less than the preset threshold, the electronic device 101 displays a third object 850 indicating a menu related to the first object 810. The third object 850 may indicate the menu related to the first object 810 such as a menu for generating a folder on the first home screen corresponding to the first object 810.

Figure 8E:
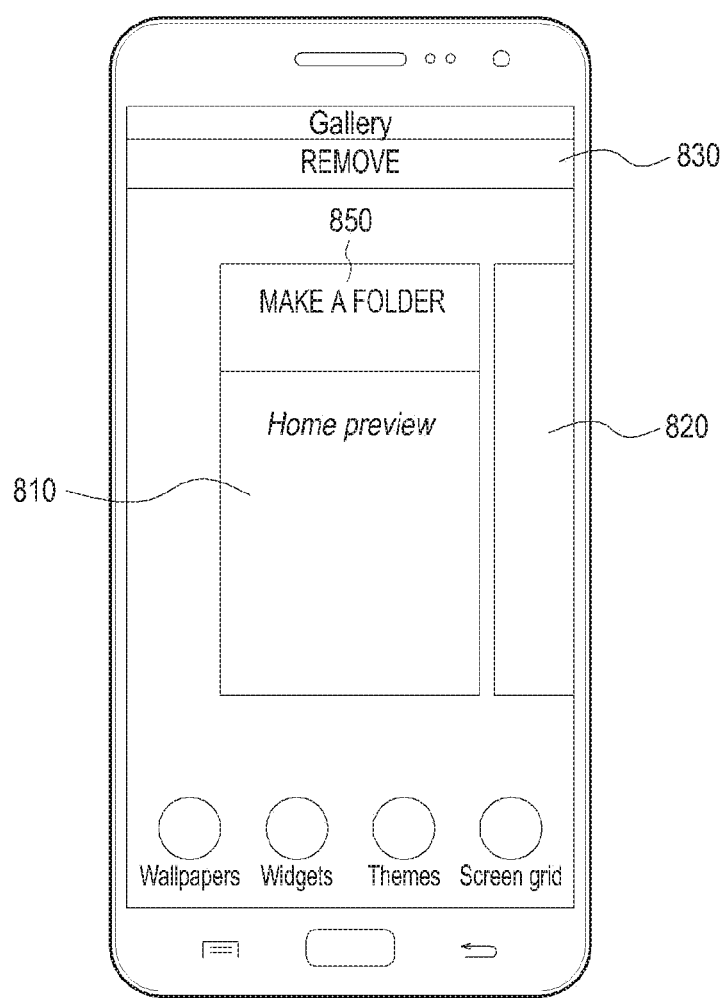

Further, the third object 850 may be displayed on a lower end of the first object 810, as illustrated in FIG. 8D, or may be displayed on an upper end of the first object 810, as illustrated in FIG. 8E, according to the movement direction of the first object 810. For example, when the movement direction of the first object 810 is the up direction, the third object 850 may be displayed on the lower end of the first object 810. When the movement direction of the first object 810 is the down direction, the third object 850 may be displayed on the upper end of the first object 810.

As described above, the electronic device 101 may determine an instruction corresponding to the first input 800, according to the speed of the first object 810, which moves according to the first input 800 in the up direction and execute the determined instruction.

FIGS. 9A to 9D are diagrams illustrating a method of processing images grouped based on a user's input by the electronic device, according to an embodiment of the present disclosure.

Figure 9A:
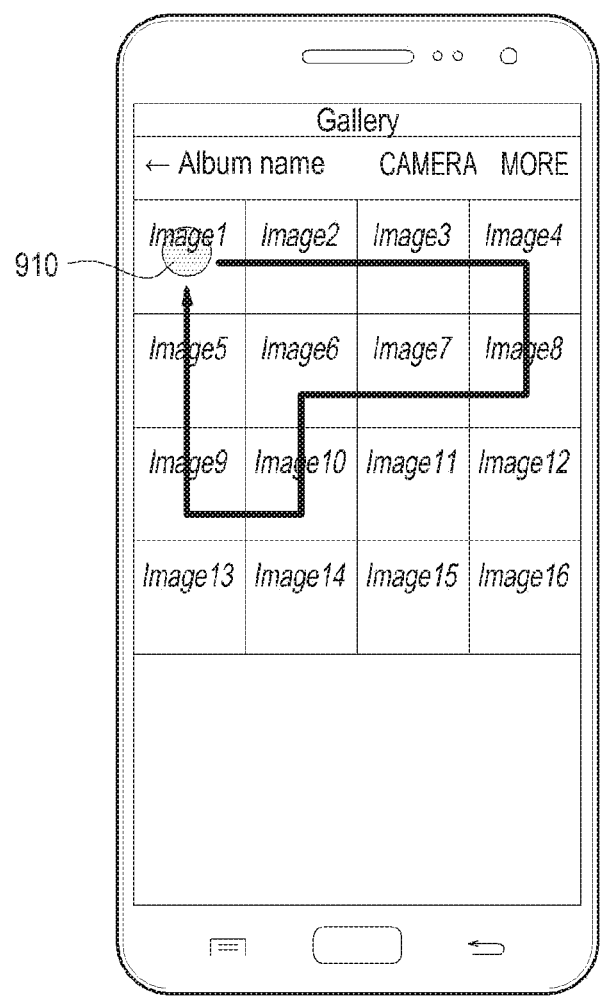
FIGS. 9A to 9D are diagrams illustrating a method of processing images grouped based on a user's input by the electronic device, according to an embodiment of the present disclosure.

FIG. 9A illustrates an execution screen of an image viewer application executed in the electronic device 101. The electronic device 101 displays a plurality of objects indicating thumbnail images corresponding to the images stored in the electronic device 101 through the image viewer application.

When a first input 910 of the user is continuously maintained and performed in an arrow direction, the electronic device 101 groups a plurality of objects corresponding to the performed first input 910 into one group.

Figure 9B:
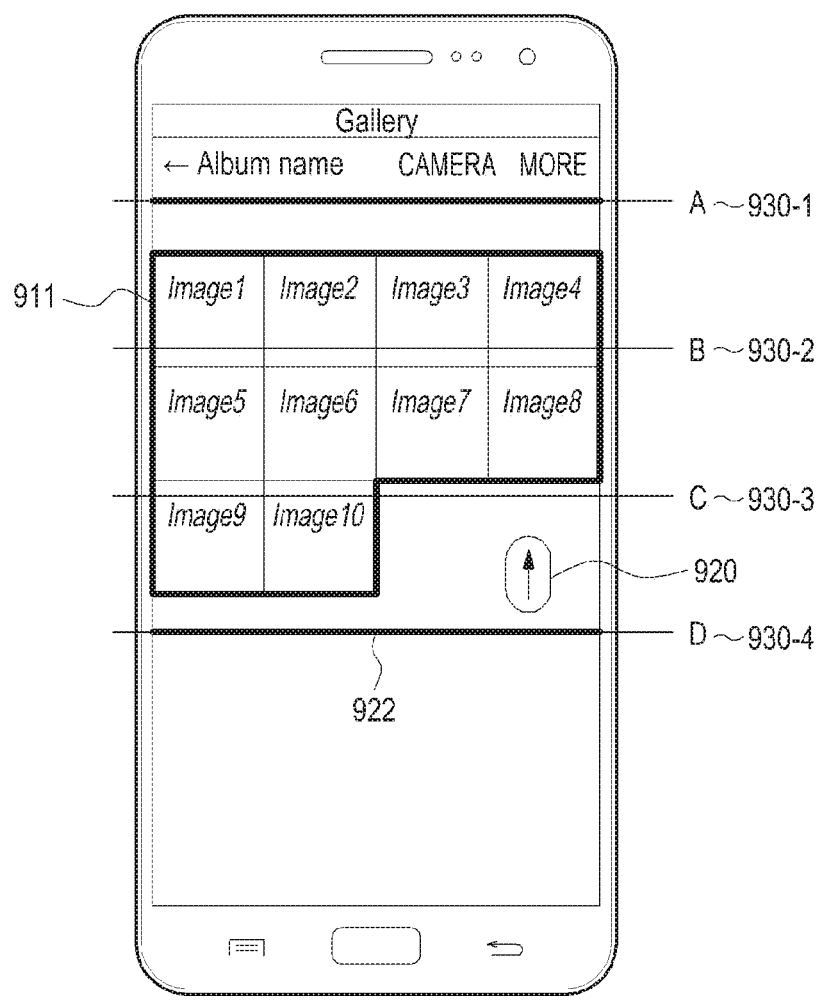

As illustrated in FIG. 9B, the electronic device 101 displays the plurality of objects grouped into one group through the first input 910. Hereinafter, a method will be described by which the electronic device 101 processes a second input 920 in an up direction according to reception of the second input 920 in the up direction related to the first object 911 indicating one group including the plurality of objects.

The electronic device 101 may set a reference line for the first object 911 to determine a speed of the first object 911 that moves according to a second input 920. The reference line may be set as one of a first reference line 922 and a second reference line 932 according to a direction of the second input 920. Further, both the first reference line 922 and the second reference line 932 may be set as the reference line and used for determining the speed of the first object.

For example, when the movement direction of the second input 920 is the up direction, the reference line may be set as the first reference line 922 corresponding to a lower side of the first object 911. When the movement direction of the second input 920 is the down direction, the reference line may be set as the second reference line 923 corresponding to an upper side of the first object 911. Hereinafter, it is assumed that the first reference line 922 is set as the reference line. However, the present disclosure is not limited thereto. The reference point or reference line may be variously set to determine the speed of the object that moves according to user's settings or the executed application.

The electronic device 101 may calculate a movement distance and a movement time of the first object 911 by using the set first reference line 922, and may determine the speed of the first object through the calculated movement distance and movement time. Further, the electronic device may determine a movement direction of the first object 911 based on the movement direction of the second input 920. For example, as illustrated in FIG. 9B, since the movement direction of the second input 920 is the up direction and the first object moves in the same direction as the movement direction of the second input 920 according to the second input 920, the electronic device 101 may determine the movement direction of the first object as the up direction.

Further, as illustrated in FIG. 9B, the electronic device 101 sets four measurement lines 930-1, 930-2. 930-3, and 930-4 for determining the speed of the first object 911. Accordingly, the electronic device 101 may determine a speed of the first reference line 922 moving from measurement line D 930-4 to measurement line B 930-2. For example, the electronic device 101 may calculate a movement time of the first reference line 922 from measurement line D 930-4 to measurement line B 930-2, determine the speed of the first reference line 922 based on a distance between measurement line D 930-4 and measurement line B 930-2 and the calculated movement time, and determine the speed of the first reference line 922 as the speed of the first object 911.

Figure 9C:
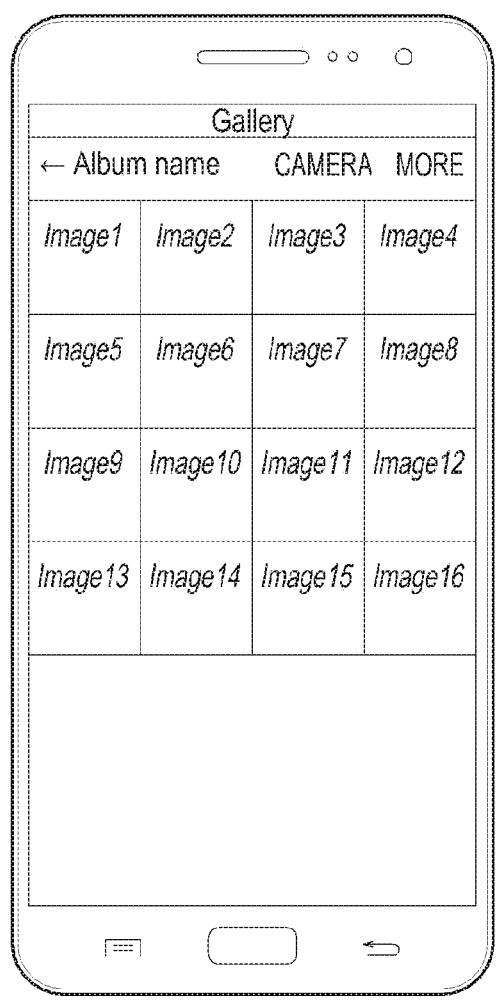

Referring to FIG. 9C, when the speed of the first object 911 is greater than or equal to a preset threshold, the electronic device 101 may release the setting of the first group. Accordingly, the electronic device 101 may display a plurality of objects indicating thumbnail images corresponding to the images stored in the electronic device 101, as illustrated in FIG. 9A.

Figure 9D:
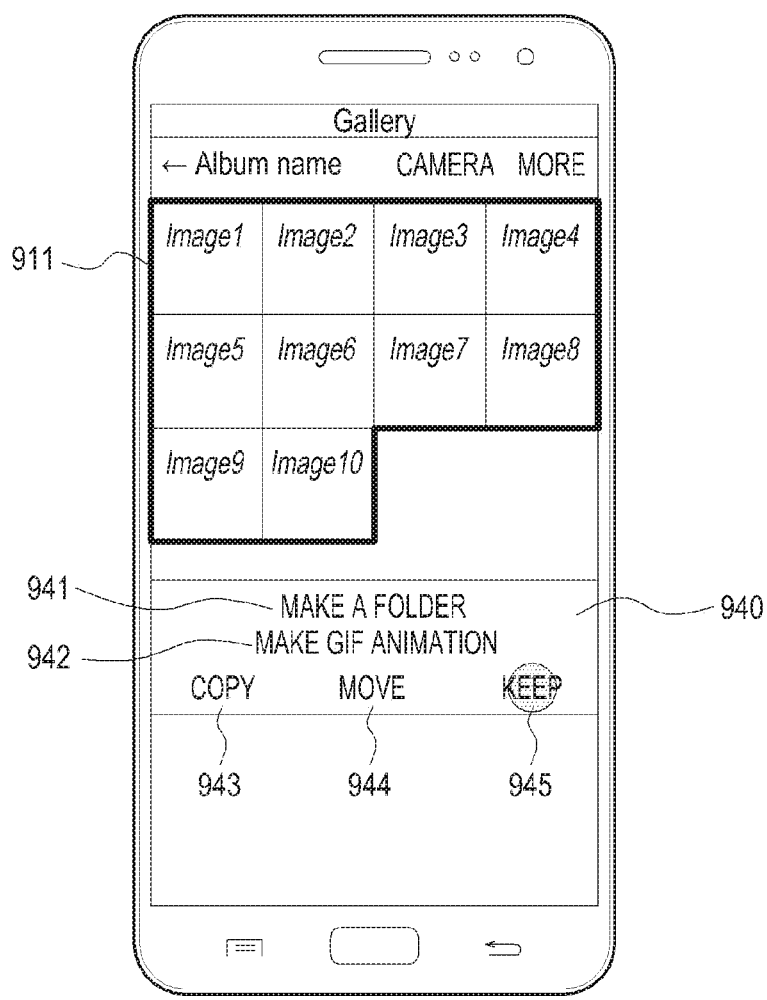

Referring to FIG. 9D, when the speed of the first object 911 is less than the preset threshold, the electronic device 101 may display a second object 940 indicating a menu related to the first object 911. The second object 940 may indicate the menu related to the first object such as a menu 941 for generating thumbnail images corresponding to a plurality of objects included in the first object 911 as one folder, a menu 942 for generating an animation through the thumbnail images, a menu 943 for copying, a menu 944 for movement, and a menu 945 for temporary storage.

FIGS. 10A to 10E are diagrams illustrating a method of processing images grouped based on a user's input by the electronic device, according to an embodiment of the present disclosure.

Figure 10A:
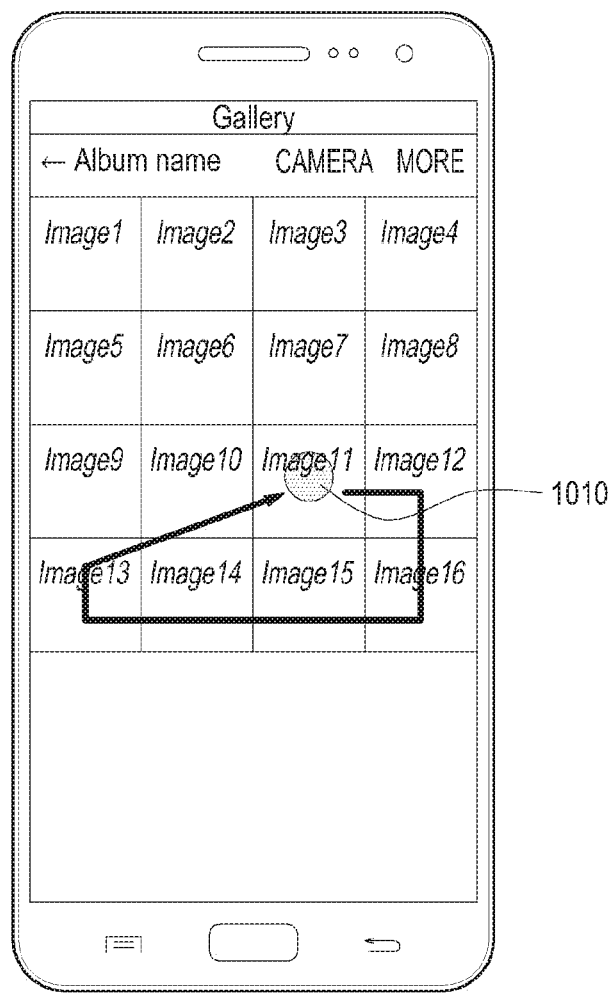
FIGS. 10A to 10E are diagrams illustrating a method of processing images grouped based on a user's input by the electronic device, according to an embodiment of the present disclosure.

FIG. 10A illustrates an execution screen of an image viewer application executed by the electronic device 101. The electronic device 101 displays a plurality of objects indicating thumbnail images corresponding to the images stored in the electronic device 101 through the image viewer application.

When a first input 1010 of the user is continuously maintained and performed in an arrow direction, the electronic device 101 groups a plurality of objects corresponding to the performed first input 1010 into one group.

Figure 10B:
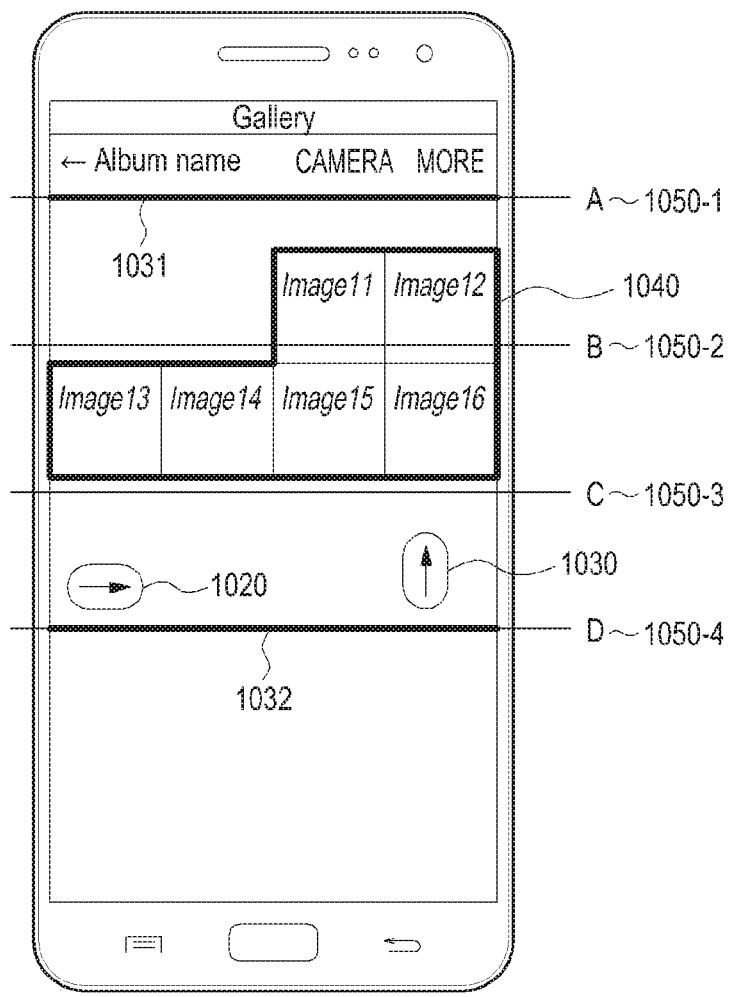

As illustrated in FIG. 10B, the electronic device 101 displays a plurality of objects grouped into one group through the first input 1010. Hereinafter, a method will be described by which the electronic device 101 processes a second input 1030 in an up direction according to reception of the second input 1030 in the up direction related to the first object 1040 indicating one group including the plurality of objects.

The electronic device 101 sets a reference line for the first object 1040 to determine a speed of the first object 1040 that moves according to a second input 1030. The reference line may be set as one of a first reference line 1031 and a second reference line 1032 according to a direction of the second input 1030. Further, both the first reference line 1031 and the second reference line 1032 may be set as the reference line and used for determining the speed of the first object 1040.

For example, when the movement direction of the second input 1030 is the up direction, the reference line may be set as the second reference line 1032 corresponding to a lower side of the first object 1040. When the movement direction of the second input 1030 is the down direction, the reference line may be set as the first reference line 1031 corresponding to an upper side of the first object 1040. Hereinafter, it is assumed that the second reference line 1032 is set as the reference line. However, the present disclosure is not limited thereto. The reference point or reference line may be variously set to determine the speed of the object that moves according to user's settings or the executed application.

The electronic device 101 may calculate a movement distance and a movement time of the first object 1040 by using the set second reference line 1032 and determine the speed of the first object 1040 through the calculated movement distance and movement time. Further, the electronic device may determine a movement direction of the first object 1040 based on the movement direction of the second input 1030. For example, as illustrated in FIG. 10B, since the movement direction of the second input 1030 is the up direction and the first object 1040 moves in the same direction as the movement direction of the second input 1030 according to the second input 1030, the electronic device 101 determines that the movement direction of the first object 1040 as the up direction.

Further, as illustrated in FIG. 10B, the electronic device 101 sets four measurement lines 1050-1, 1050-2. 1050-3, and 1050-4 for determining the speed of the first object 1040. Accordingly, the electronic device 101 may determine a speed of the second reference line 1032 moving from measurement line D 1050-4 to measurement line C 1050-3. For example, the electronic device 101 may calculate a movement time of the second reference line 1032 from measurement line D 1050-4 to measurement line C 1050-3, determine the speed of the second reference line 1032 based on a distance between measurement line D 1050-4 and measurement line C 1050-3 and the calculated movement time, and determine the speed of the second reference line 1032 as the speed of the first object.

Figure 10C:
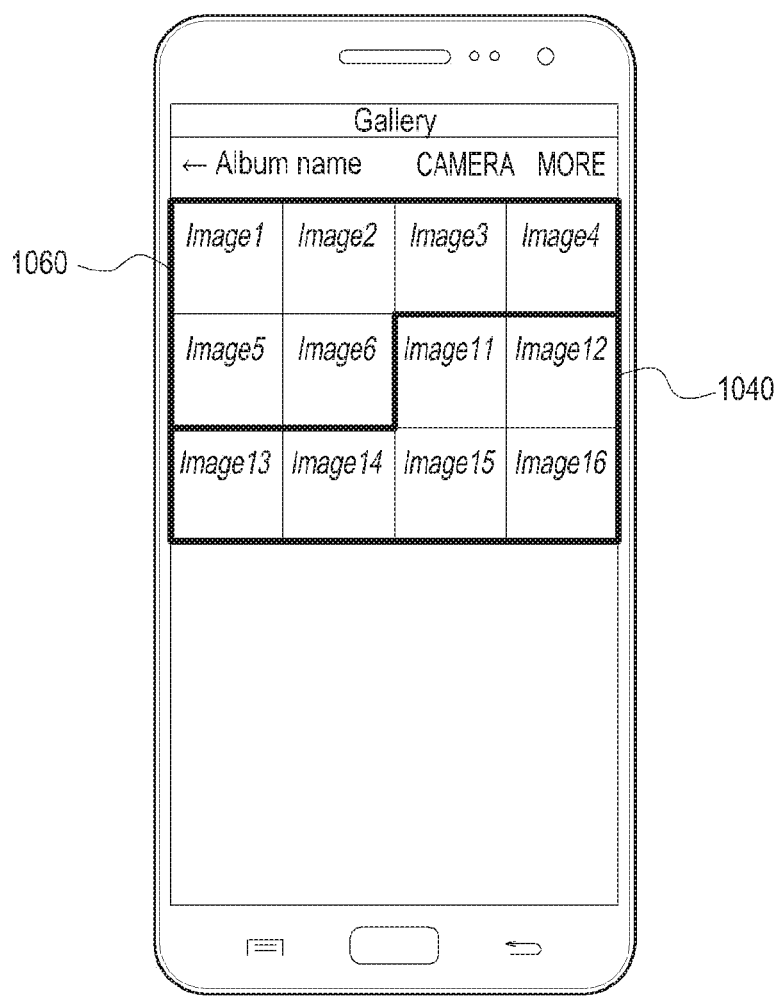
Figure 10D:
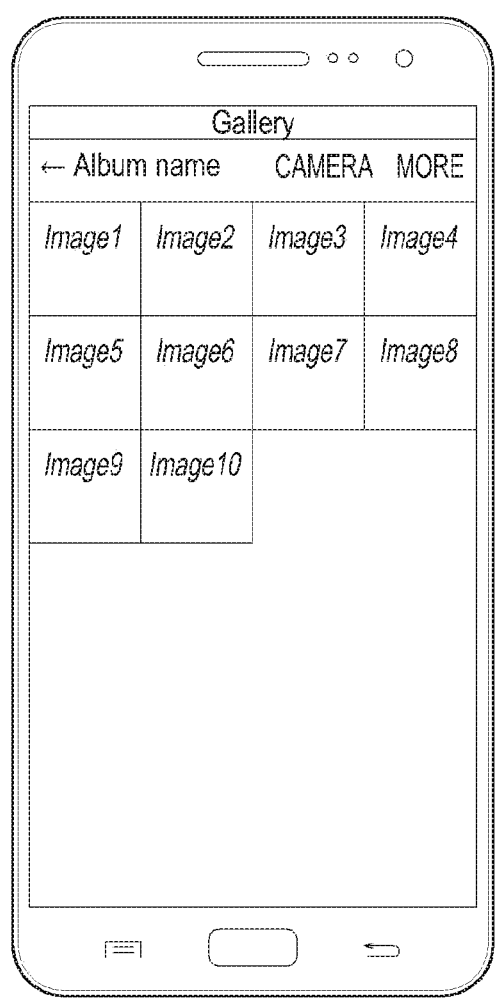

Referring to FIG. 10D, when the speed of the first object 1040 is greater than or equal to the preset threshold, the electronic device 101 deletes thumbnail images included in the group corresponding to the first object 1040. Accordingly, the electronic device 101 may display only a plurality of objects corresponding to the remaining thumbnail images except for the thumbnail images included in the group.

Figure 10E:
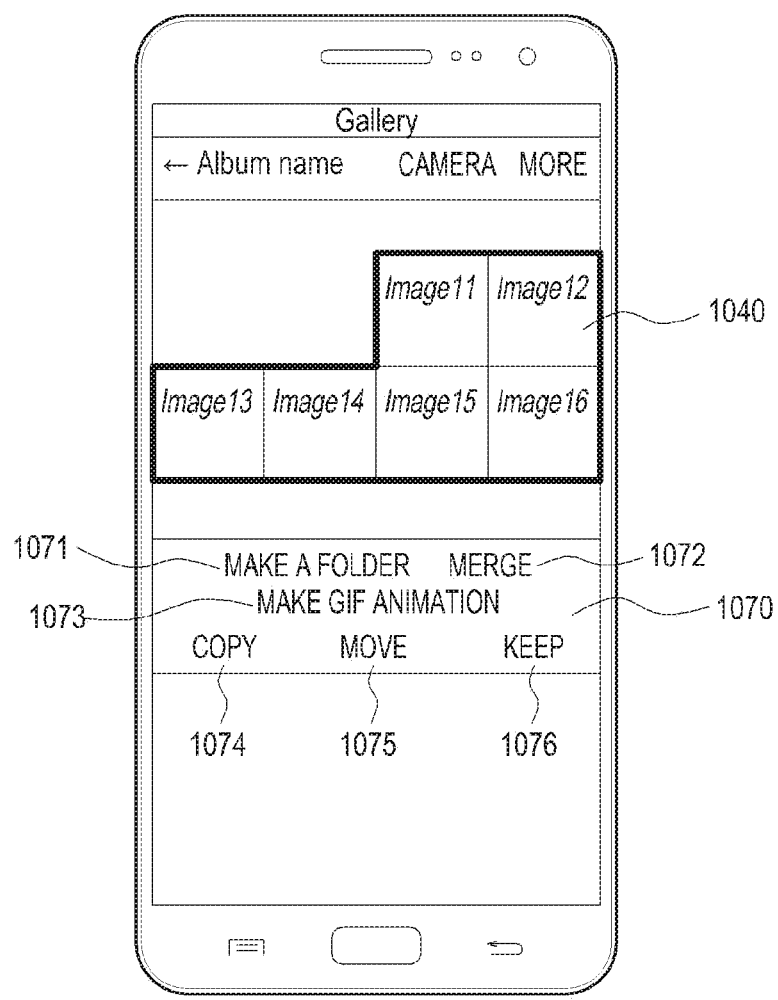

Referring to FIG. 10E, when the speed of the first object 1040 is less than the preset threshold, the electronic device 101 displays a second object 1070 indicating a menu related to the first object 1040. The second object 1070 indicates the menu related to the first object, such as a menu 1071 for generating thumbnail images corresponding to a plurality of objects included in the first object 1040 as one folder, a menu 1072 for generating an animation through the thumbnail images, a menu 1073 for copying, a menu 1074 for movement, and a menu 1075 for temporary storage.

Referring to back to FIG. 10B, the electronic device 101 receives a third input 1020 in a right direction different from the direction of the second input 1030. The electronic device 101 may also determine the speed of the first object 1040 that moves according to the third input 1020. In this case, the method of determining the speed of the object described with respect to FIGS. 5A to 6D may be applied here as well. When the speed of the first object 1040 that moves according to the third input 1020 is greater than or equal to the preset threshold, the electronic device 101 may execute an instruction different from the instruction that is executed when the speed of the first object 1040 moving according to the second input 1030 is greater than or equal to the preset threshold.

For example, referring to FIG. 10C, when the speed of the first object 1040 moving according to the third input 1020 is greater than or equal to the preset threshold, the electronic device 101 may display the first object 1040 along with a third object 1060 indicating another group which has been grouped in advance. Further, the electronic device 101 may re-group a plurality of thumbnail images included in the third object 1060 and the second object 1040 into one group.

As described above, even when the speed of the first object 1040 is greater than or equal to the preset threshold, the electronic device 101 may determine and execute an instruction corresponding to the input by further considering a movement direction of the first object 1040.

FIGS. 11A to 11D are diagrams illustrating a method of processing a rotation input by the electronic device, according to an embodiment of the present disclosure.

Figure 11A:
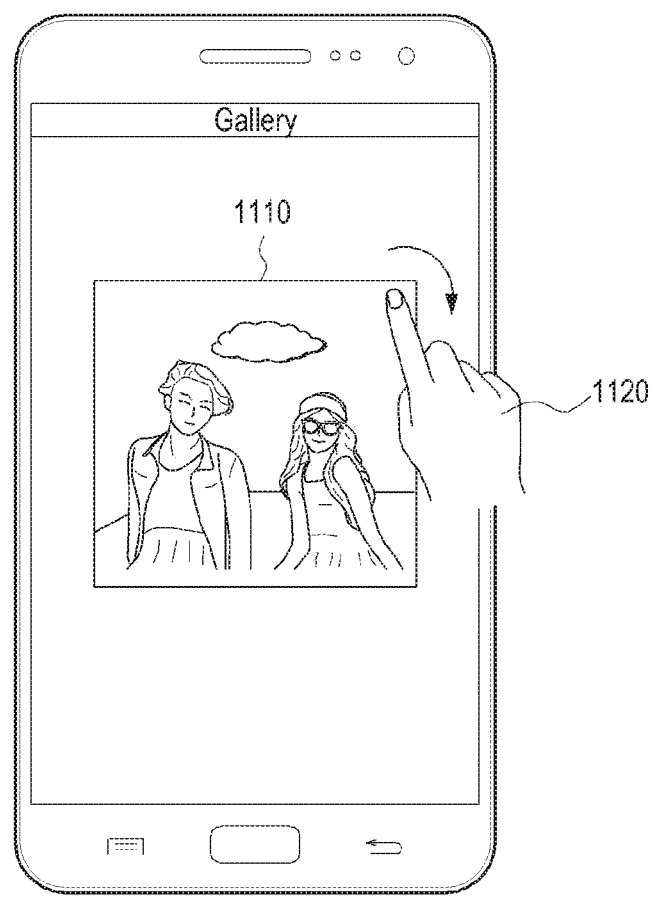
FIGS. 11A to 11D are diagrams illustrating a method of processing a rotation input by the electronic device, according to an embodiment of the present disclosure.

Referring to FIG. 11A, the electronic device 101 displays a first object 1110 corresponding to a first image through an image viewer application. Hereinafter, a method is described in which the electronic device 101 processes a first input 1120 corresponding to a rotation input according to reception of the first input 1120 corresponding to the rotation input for rotating a display direction of the first object 1110 in a clockwise direction.

The display direction of the first object 1110 may be rotated in a clockwise direction according to the first input 1120. In this case, the electronic device 101 may determine an angular speed of the first object 1110 of which the display direction is rotated in the clockwise direction according to the first input 1120. For example, the electronic device 101 may set a virtual line that passes through the center point of the first object 1110 in order to determine the angular speed of the first object 1110. However, a random line or point within the first object 1110 may be set as a reference line or a reference point for calculating the angular speed.

The electronic device 101 may calculate a rotation angle and a rotation time of the first object 1110 by using the set reference line and determine the angular speed of the first object 1110 through the calculated rotation angle and rotation time. Further, the electronic device 101 may determine a rotation direction of the first object 1110 based on a movement direction of the first input 1120.

Figure 11B:
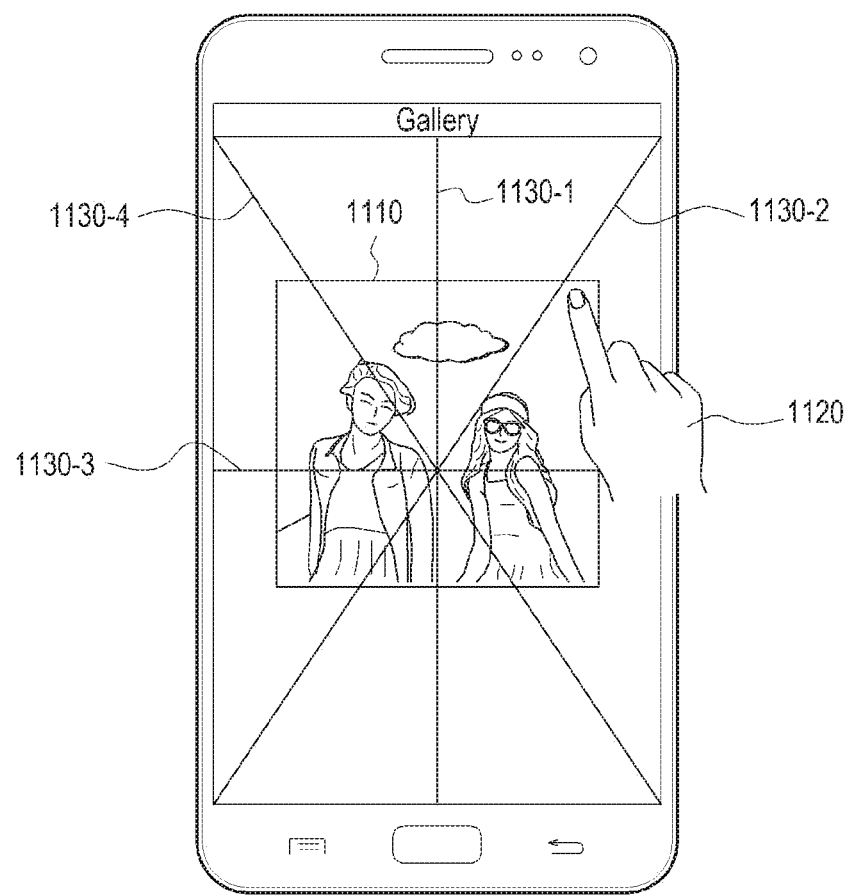

In addition, as illustrated in FIG. 11B, the electronic device 101 sets four measurement lines 1130-1, 1130-2, 1130-3, and 1130-4 for determining the angular speed of the first object 1110. For example, the electronic device 101 may determine an angular speed of the reference line that rotates from a first measurement line 1130-1 to a third measurement line 1130-3. For example, the electronic device 101 may calculate a rotation time of the set reference line from the first measurement line 1130-1 to the third measurement line 1130-3 and calculate an angle between the first measurement line 1130-1 and the third measurement line 1130-3 based on the determined rotation direction. The electronic device 101 may determine the angular speed of the reference line by using the calculated rotation time and rotation angle and determine the angular speed of the reference line as the angular speed of the first object 1110.

Figure 11C:
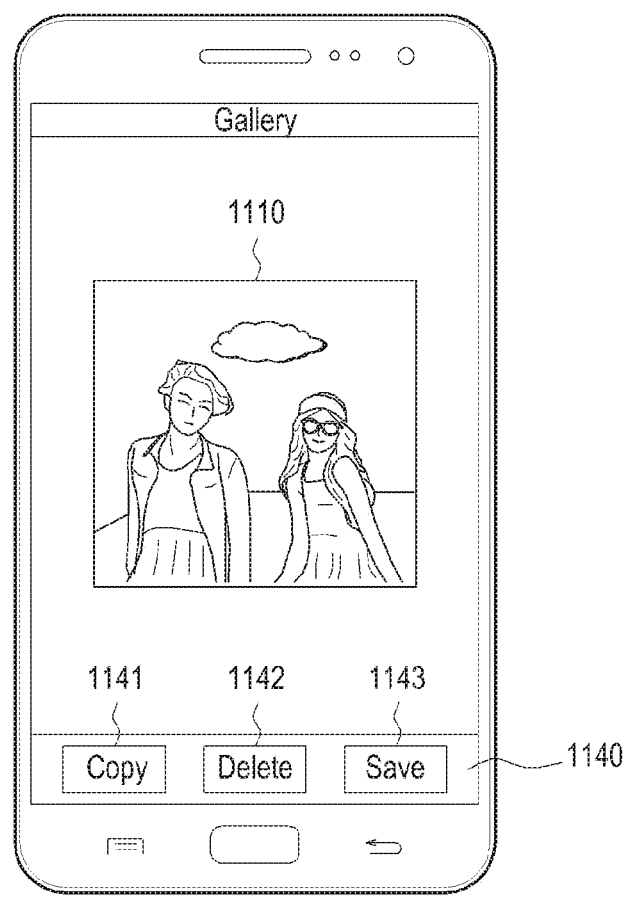

Referring to FIG. 11C, when the determined angular speed of the first object 1110 is greater than or equal to the preset threshold, the electronic device 101 displays a second object 1140 indicating a menu related to the first object 1110. The second object 1140 may indicate the menu related to the first object 1110 such as a menu 1141 for copying an image corresponding to the first object 1110, a menu 1142 for deleting the image, or a menu 1143 for storing the image.

Figure 11D:
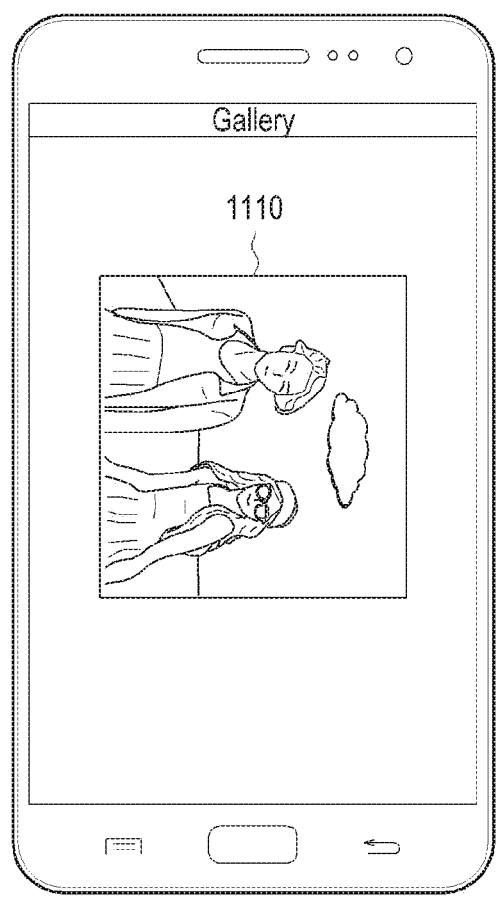

Further, as illustrated in FIG. 11D, when the angular speed of the first object 1110 is less than the preset threshold, the electronic device 101 rotates the first object 1110 in accordance with the first input 1120. The electronic device 101 may display the first object 1110 in a state where the display direction is rotated according to the first input 1120.

FIGS. 12A to 12D are diagrams illustrating a method of processing a plurality of inputs by the electronic device, according to an embodiment of the present disclosure.

Figure 12A:
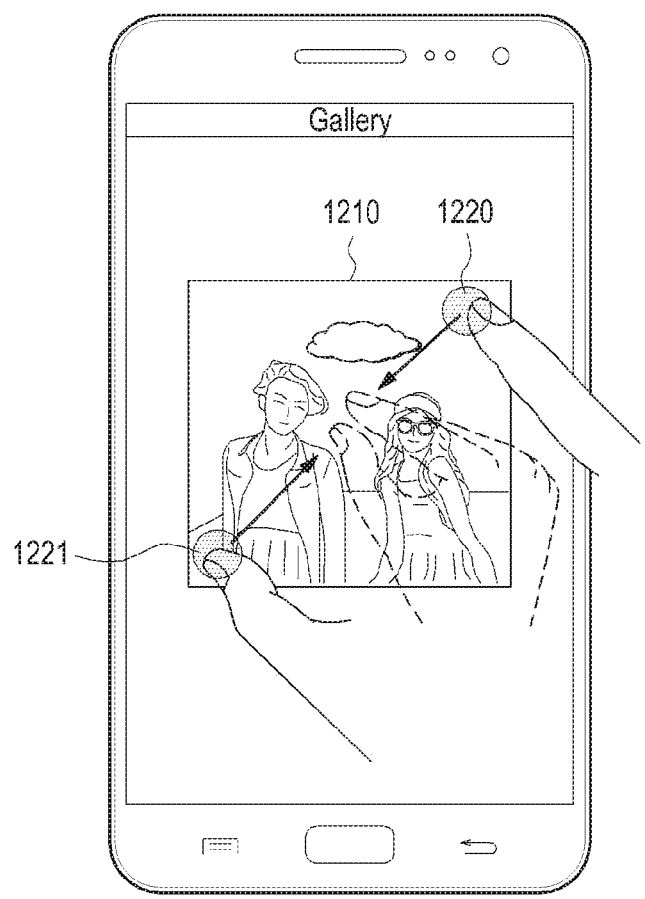
FIGS. 12A to 12D are diagrams illustrating a method of processing a plurality of inputs by the electronic device, according to an embodiment of the present disclosure.

Referring to FIG. 12A, the electronic device 101 displays a first object 1210 corresponding to a first image through an image viewer application. Hereinafter, a method is described in which the electronic device 101 processes a first input and a second input according to reception of the first input and the second input for enlarging or reducing the first object 1210.

As the first input and the second input are received, the first object 1210 may be enlarged or reduced and then displayed. The electronic device 101 may enlarge or reduce the first object 1210 according to directions of the first input and the second input and display the enlarged or reduced first object. Hereinafter, a case where the first object 1210 is reduced according to the first input and the second input will be mainly described. The same method can be applied to a case where the first object 1210 is enlarged according to the first input and the second input.

The electronic device 101 may determine speeds of a first point 1220 corresponding to the first input and a second point 1221 corresponding to a second input. For example, the electronic device 101 may set each reference line for determining the speeds of the first point 1220 and the second point 1221. Further, the electronic device 101 may also determine movement directions of the first point 1220 and the second point 1221 according to directions of the first input and the second input.

Figure 12B:
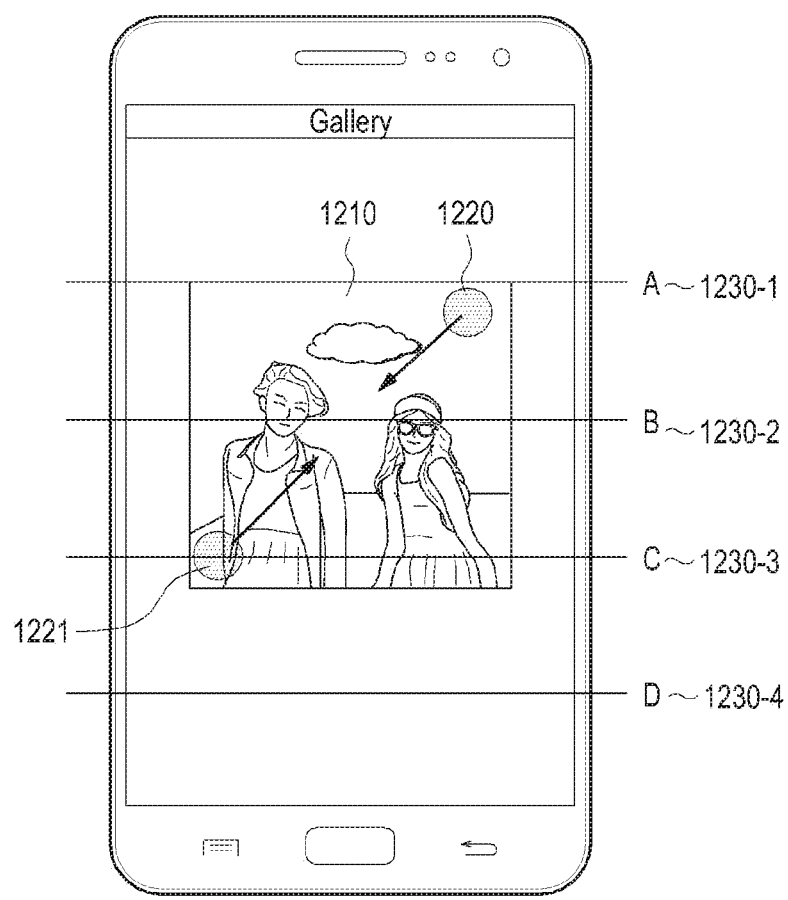

In addition, as illustrated in FIG. 12B, the electronic device 101 sets four measurement lines 1230-1, 1230-2, 1230-3, and 1230-4 for determining speeds of the first point 1220 and the second point 1221. Accordingly, the electronic device 101 may calculate a movement time and distance of a reference line set for each of the first point 1220 and the second point 1221 between at least two measurement lines of the four measurement lines, determine a speed of each reference line based on the calculated distance and time, and determine the speeds of the reference lines as the speeds of the first point 1220 and the second point 1221.

Figure 12C:
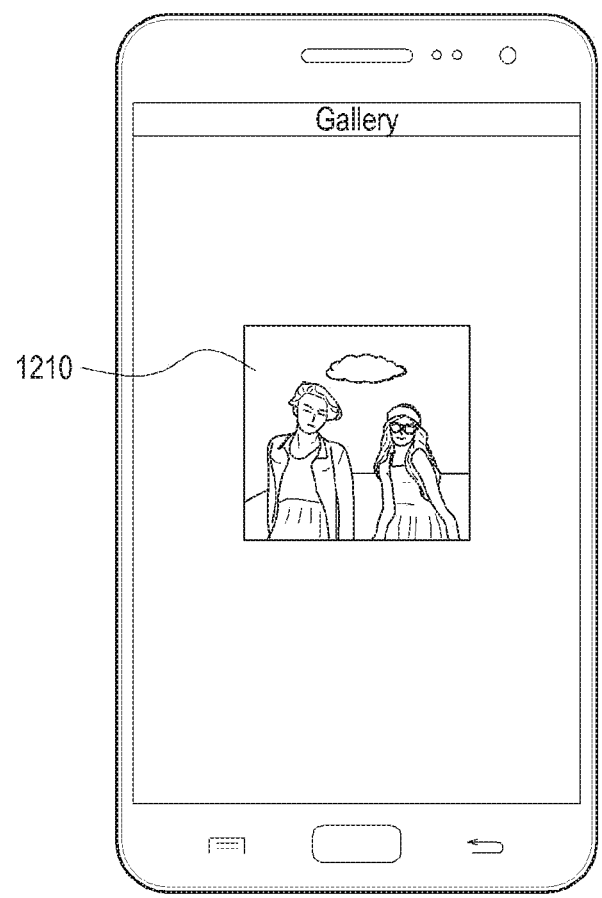

Referring to FIG. 12C, when the speeds of the first point 1220 and the second point 1221 are less than the preset threshold, the electronic device 101 reduces and displays the first object 1210 in accordance with the first input and the second input.

Figure 12D:
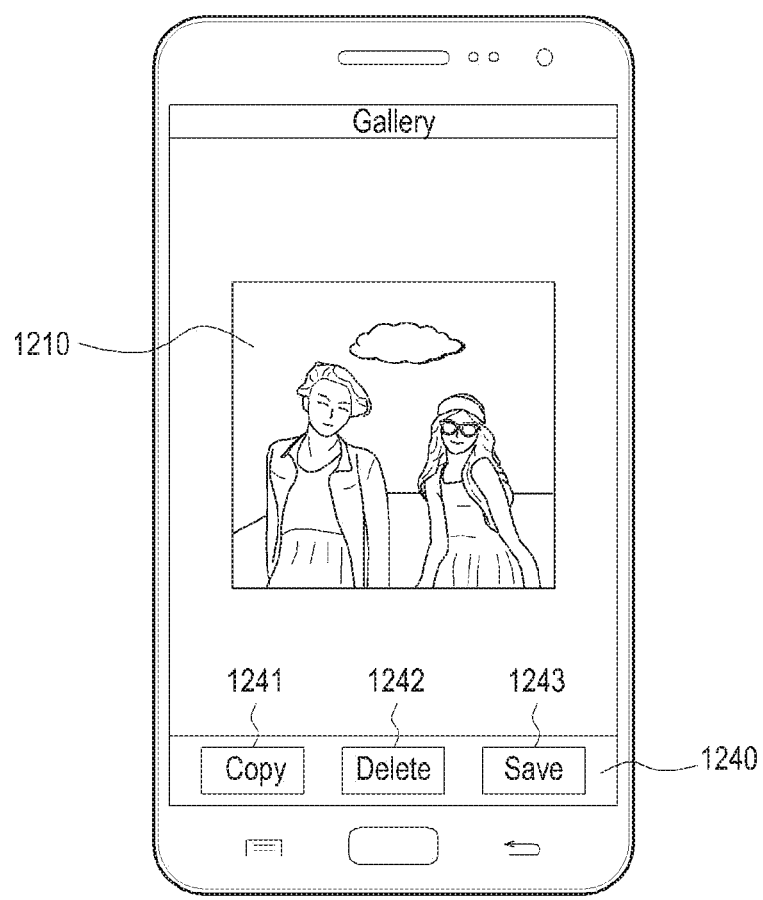

Referring to FIG. 12D, when the speeds of the first point 1220 and the second point 1221 are greater than or equal to the preset threshold, the electronic device 101 displays a second object 1240 indicating a menu related to the first object 1220. The second object 1240 may indicate the menu related to the first object 1210 such as a menu 1241 for copying an image corresponding to the first object 1210, a menu 1242 for deleting the image, or a menu 1243 for storing the image.

Figure 13:
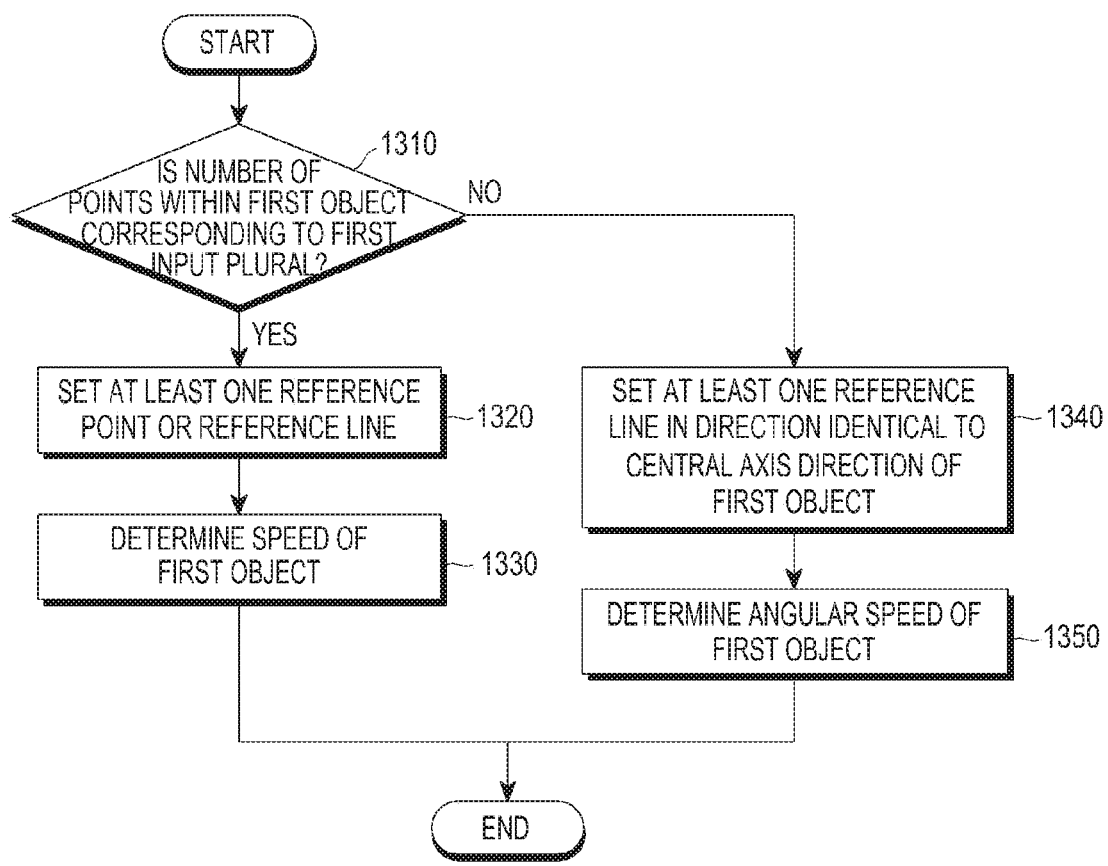
FIG. 13 is a flowchart illustrating a method of determining a speed or an angular speed of a three dimensional object by the electronic device, according to an embodiment of the present disclosure.

FIG. 13 is a flowchart illustrating a method of determining a speed or an angular speed of a three dimensional object by the electronic device, according to an embodiment of the present disclosure.

When a first object is a three dimensional object, the electronic device 101 determines whether the number of points within the first object correspond to a plurality of first inputs, according to reception of the first input, in step 1310.

In order to distinguish whether the first input is an input for moving the three dimensional object or an instruction for rotating the three dimensional object, the electronic device 101 determines whether there are a plurality of points within the first object corresponding to the first input.

When there are a plurality of points, the electronic device 101 sets at least one reference point or reference line within the first object to determine a speed of the first object, in step 1320.

In operation 1330, the electronic device 101 calculates a movement distance and a movement time of the first object that moves according to the first input based on the set reference point or reference line, and determines the speed of the first object based on the calculated movement distance and movement time.

When there is a single point within the first object corresponding to the first input, the electronic device 101 sets at least one reference line in the same direction as the central axis direction of the first object to determine an angular speed of the first object, in step 1340.

In step 1350, the electronic device 101 calculates a rotation direction, a rotation angle, and a rotation time of the first object that rotates according to the first input based on the reference line and determine the angular speed of the first object based on the calculated rotation direction, rotation angle, and rotation time.

The electronic device 101 may compare the determined speed or angular speed of the first object with a preset threshold and execute an instruction corresponding to the first input determine based on a result of the comparison.

FIGS. 14A to 14D area diagrams illustrating a method of processing an input related to a three dimensional object by the electronic device, according to an embodiment of the present disclosure.

Figure 14A:
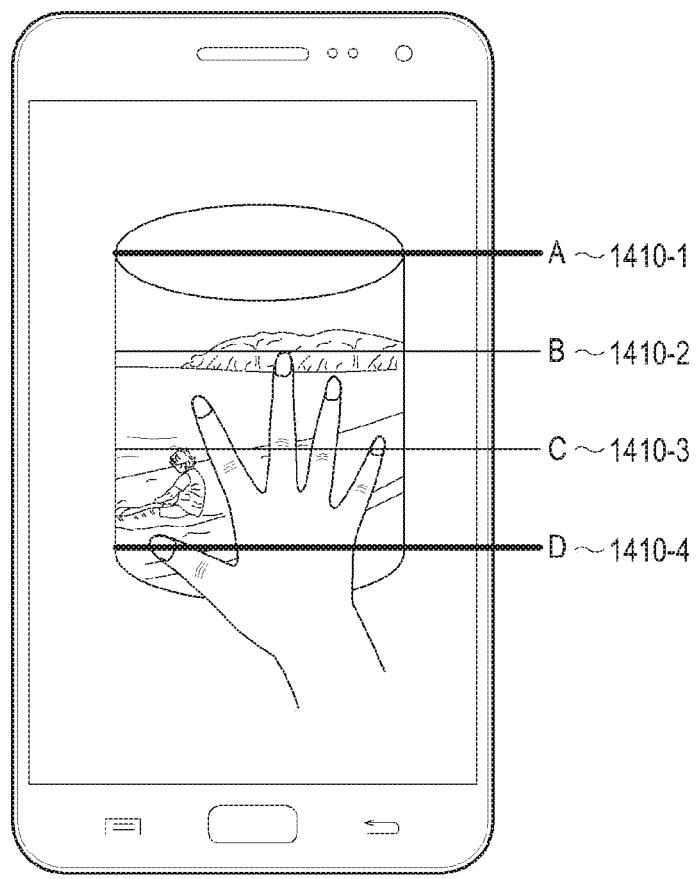
FIGS. 14A to 14D are diagrams illustrating a method of processing an input related to a three dimensional object by the electronic device, according to an embodiment of the present disclosure.

FIG. 14A illustrates an execution screen of an application for displaying a three dimensional first object 1410 in the electronic device 101. The electronic device 101 may display the first object 1410 through the application. In FIGS. 14 and 15, the three dimensional object is displayed in a cylindrical shape, but the three dimensional object is not limited thereto and may be displayed in various shapes. Further, FIGS. 14A to 14D describe a case where a first object 1410 moves when the number of points corresponding to a first input is plural.

Hereinafter, a method will be described by which the electronic device 101 processes a first input related to the first object 1410 according to reception of the input.

Figure 14B:
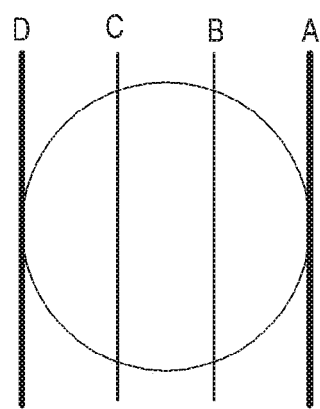

When there are a plurality of points corresponding to the first input, in other words, when the first input is an input for moving the first object 1410, the electronic device 101 may determine a speed of the first object 1410 according to the first input. For example, as illustrated in FIG. 14A, the electronic device 101 sets a reference line to be parallel to a top surface and a bottom surface of the first object 1410 in order to determine the speed of the first object 1410. Further, as illustrated in FIG. 14B, the electronic device 101 sets a reference line based on a top surface of the first object 1410 in order to determine the speed of the first object 1410. The electronic device 101 may set the reference line through a scheme of FIGS. 14A and 14B according to a movement direction of the first object 1410 based on the first input. However, the reference line or reference point may be set through various schemes to determine the speed of the first object 1410.

The electronic device 101 may calculate a movement distance and a movement time of the first object 1410 based on the set reference line, and determine the speed of the first object 1410 through the calculated movement distance and movement time. Further, the electronic device 101 may also determine a movement direction of the first object 1410 based on the movement direction of the first input.

As illustrated in FIG. 14A, the electronic device 101 sets four measurement lines 1410-1, 1410-2, 1410-3, and 1410-4 for determining the speed of the first object 1410 to parallel to be the top surface or the bottom surface of the first object 1410. As illustrated in FIG. 14B, the electronic device 101 sets four measurement lines for determining the speed of the first object 1410 based on the top surface of the first object 1410.

The electronic device 101 may determine the speed of the first object 1410 according to the first input based on the set measurement line and the set reference line of FIG. 14A or 14B. The speed of the first object 1410 is determined in the same manner as that described above.

Figure 14C:
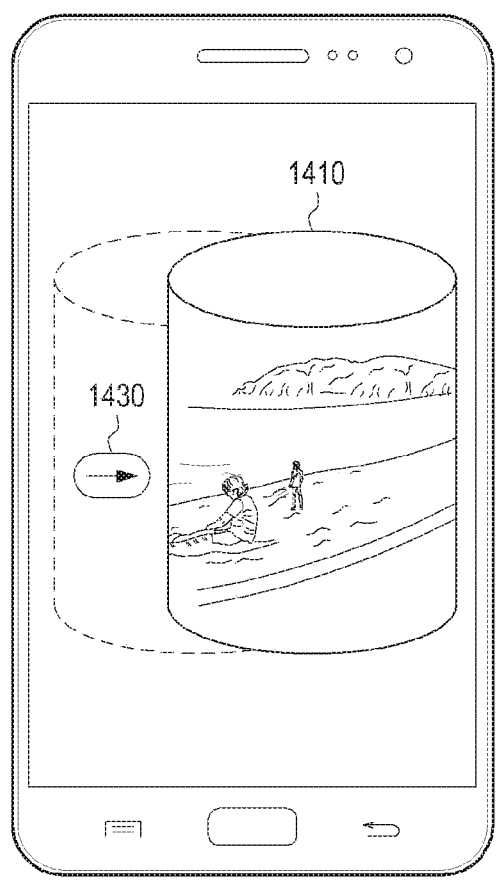

Referring to FIG. 14C, when the speed of the first object 1410 is less than the preset threshold, the electronic device 101 moves and displays the first object 1410 according to the first input. The first object 1410 may be moved and displayed in the same direction as the movement direction 1430 of the first input.

Figure 14D:
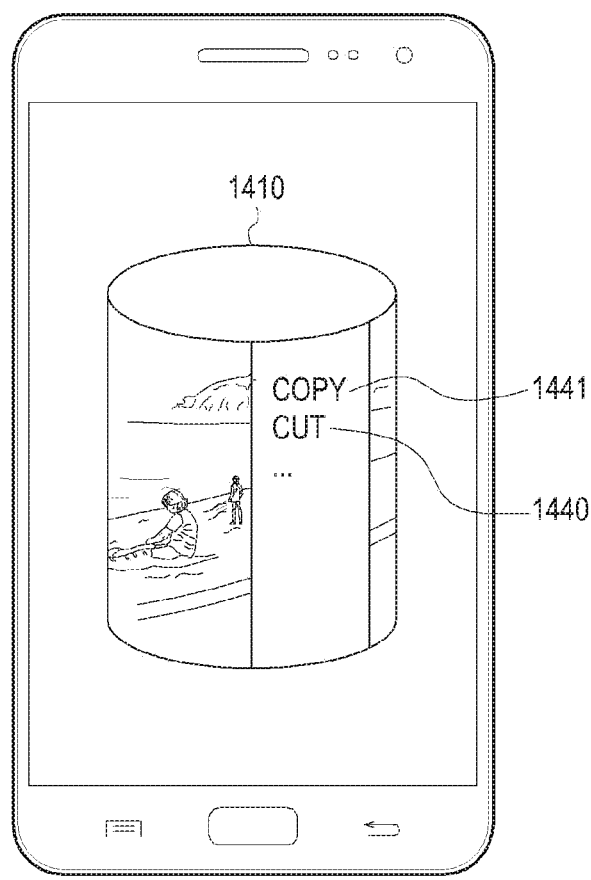

Referring to FIG. 14D, when the speed of the first object 1410 is greater than or equal to the preset threshold, the electronic device 101 displays a second object indicating a menu related to the first object 1410 (for example, a menu indicating cutting 1440 or copying 1441).

Figure 15A:
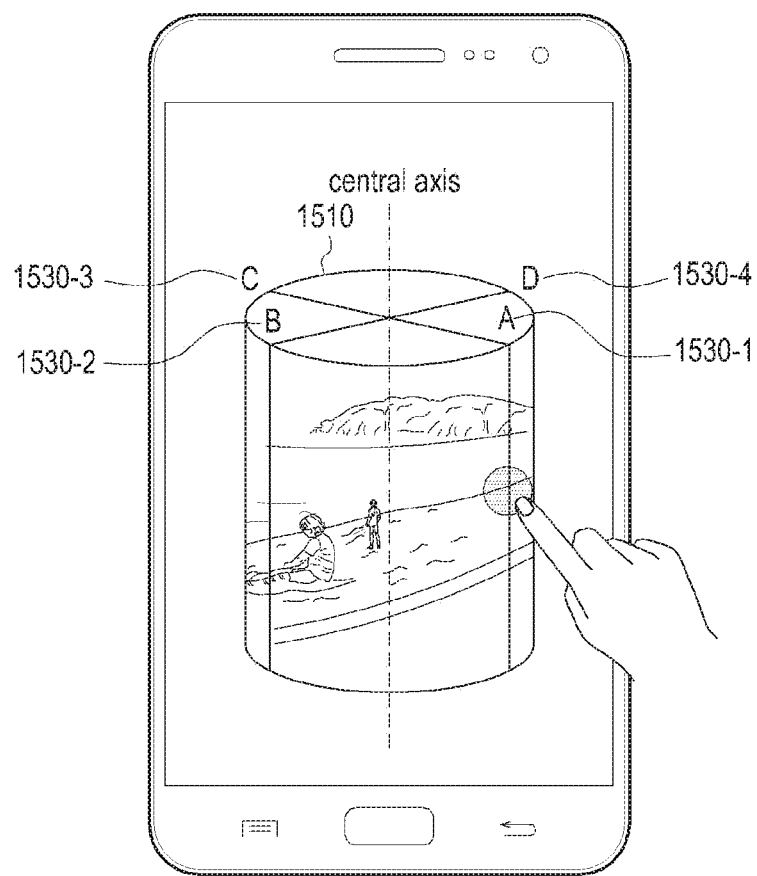
FIGS. 15A to 15C are diagrams illustrating a method of processing an input related to a three dimensional object by the electronic device, according to an embodiment of the present disclosure.
Figure 15B:
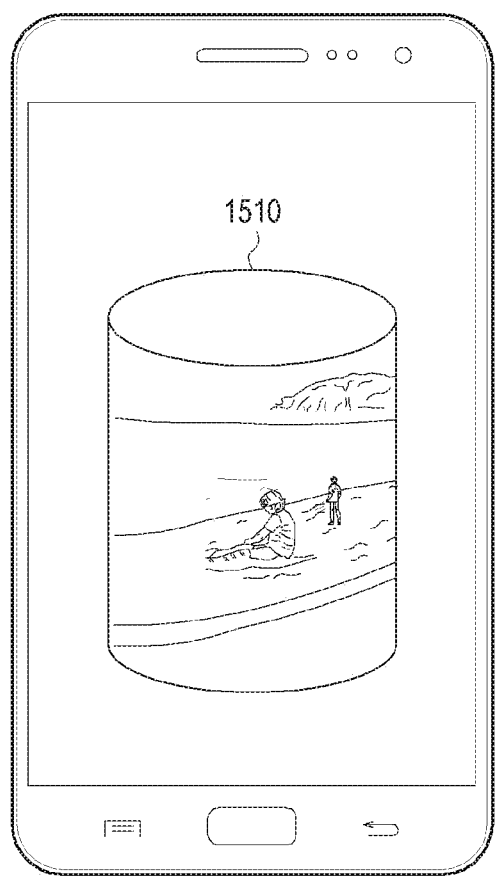
Figure 15C:
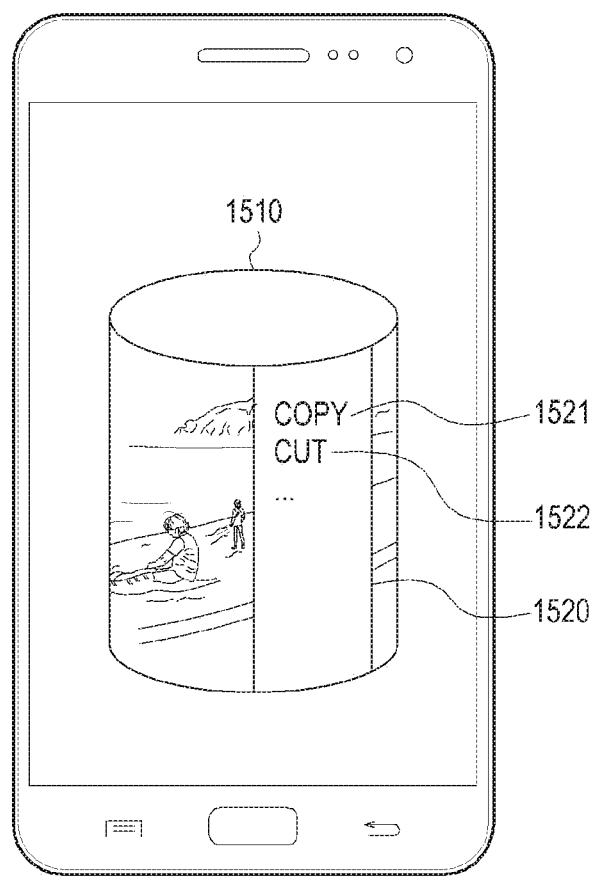

FIGS. 15A to 15C are diagrams illustrating a method of processing an input related to a three dimensional object by the electronic device, according to an embodiment of the present disclosure.

Similar to FIG. 14A, FIG. 15A illustrates an execution screen of an application for displaying a three dimensional first object 1510 in the electronic device 101. The electronic device 101 displays the first object 1510 through the application. FIGS. 15A to 15C describe a case where the first object 1510 rotates when there is a single point corresponding to a first input.

Hereinafter, a method is described in which the electronic device 101 processes a first input related to the first object 1510 according to reception of the input.

When there is a single point corresponding to the first input, in other words, when the first point is an input for rotating the first object 1510, the electronic device 101 may determine an angular speed of the first object 1510 according to the first input. For example, as illustrated in FIG. 15A, the electronic device 101 sets a reference line in the same direction as that of the central axis of the first object 1510 in order to determine the angular speed of the first object 1510. However, this is only for the description, and a random line or point within the first object 1510 may be set as a reference line or a reference point for calculating the angular speed.

The electronic device 101 may calculate a rotation angle and a rotation time of the first object 1510 by using the set reference line and determine the angular speed of the first object 1510 through the calculated rotation angle and rotation time. Further, the electronic device 101 may determine a rotation direction of the first object 1510 based on a movement direction of the first input.

As illustrated in FIG. 15A, the electronic device 101 sets four measurement lines 1530-1, 1530-2, 1530-3, and 1530-4 for determining the angular speed of the first object 1510. The electronic device 101 may determine the angular speed of the first object 1510 that rotates according to the first input based on the set measurement lines and reference line. Since a detailed method of determining the angular speed of the first object 1510 is the same as the above described method of determining the angular speed of FIGS. 11A to 11D, a separate description will be omitted.

Referring to FIG. 15B, when the angular speed of the first object 1510 is less than a preset threshold, the electronic device 101 rotates and display the first object 1510 according to the first input. The first object 1510 may be rotated and displayed in a movement direction of the first input.

Referring to FIG. 15C, when the angular speed of the first object 1510 is greater than or equal to the preset threshold, the electronic device 101 displays a second object 1520 indicating a menu related to the first object 1510 (for example, a menu indicating copying 1521 or cutting 1522).

FIGS. 16A to 16E are diagrams illustrating a method of processing an input for moving an icon by the electronic device, according to an embodiment of the present disclosure.

Figure 16A:
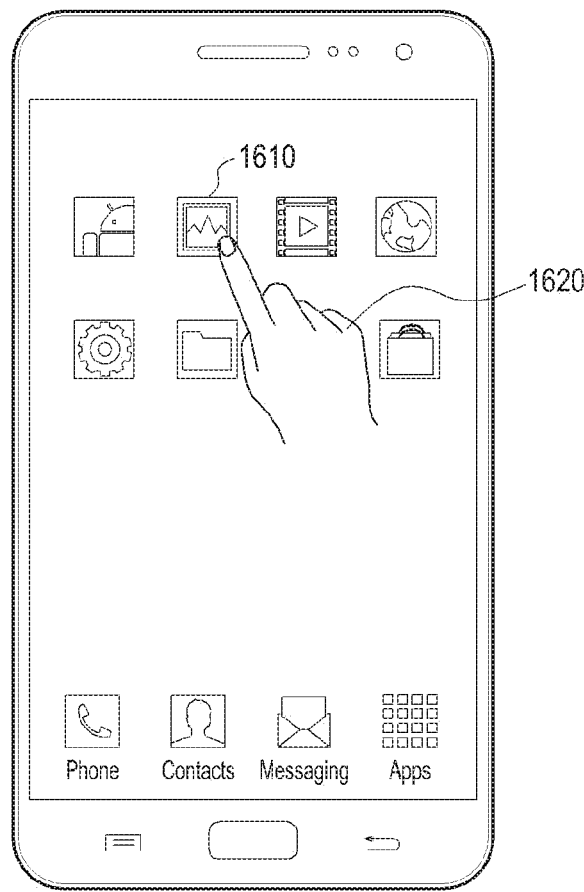
FIGS. 16A to 16E are diagrams illustrating a method of processing an input for moving an icon by the electronic device, according to an embodiment of the present disclosure.

Referring to FIG. 16A, the electronic device 101 displays a plurality of objects corresponding to icons of various applications installed in the electronic device 101. Hereinafter, a method will be described by which the electronic device 101 processes a first object 1610 indicating a first icon corresponding to a first input 1620 according to reception of the first input 1620. In FIG. 16A, it is assumed that a first threshold and a second threshold are set to determine an instruction corresponding to the first input 1620.

Figure 16B:
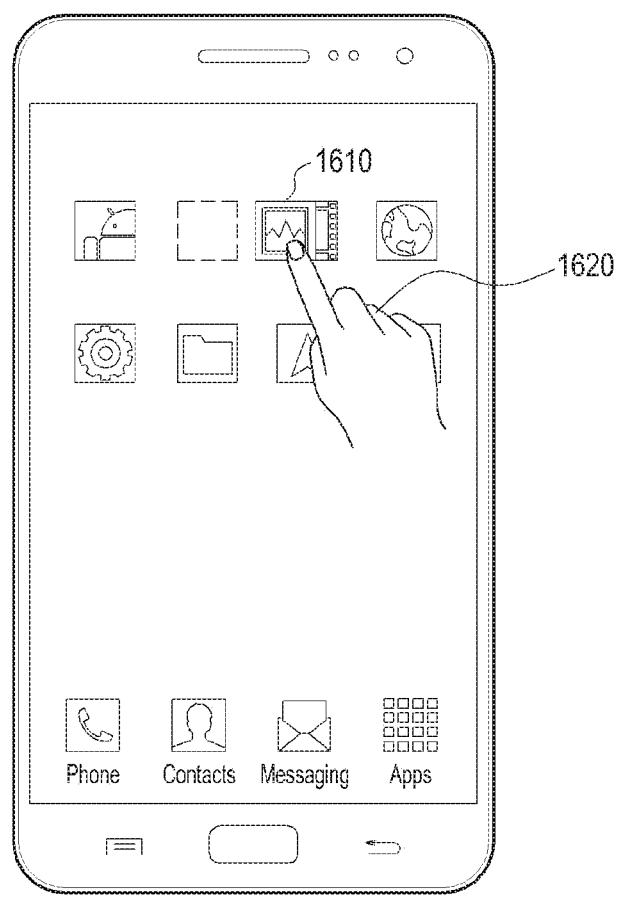

As illustrated in FIG. 16B, the electronic device 101 moves the first object 1610 according to the received first input 1620. Further, the electronic device 101 may determine a speed of the first object 1610 that moves according to the first input 1620. A method of determining the speed of the first object 1610 that moves according to the first input 1620 is the same as that described above.

Figure 16C:
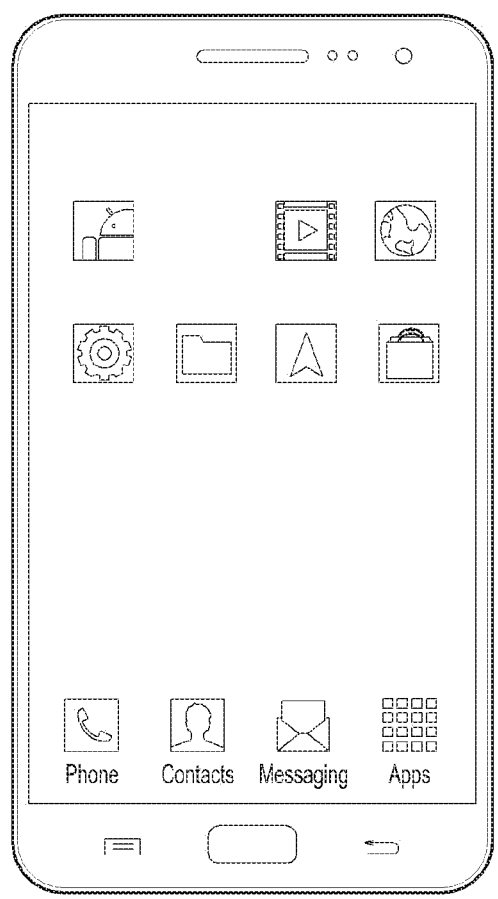

Referring to FIG. 16C, when the speed of the first object 1610 is less than the first threshold and the second threshold, the electronic device 101 deletes the first object 1610 corresponding to the first input 1620.

Figure 16D:
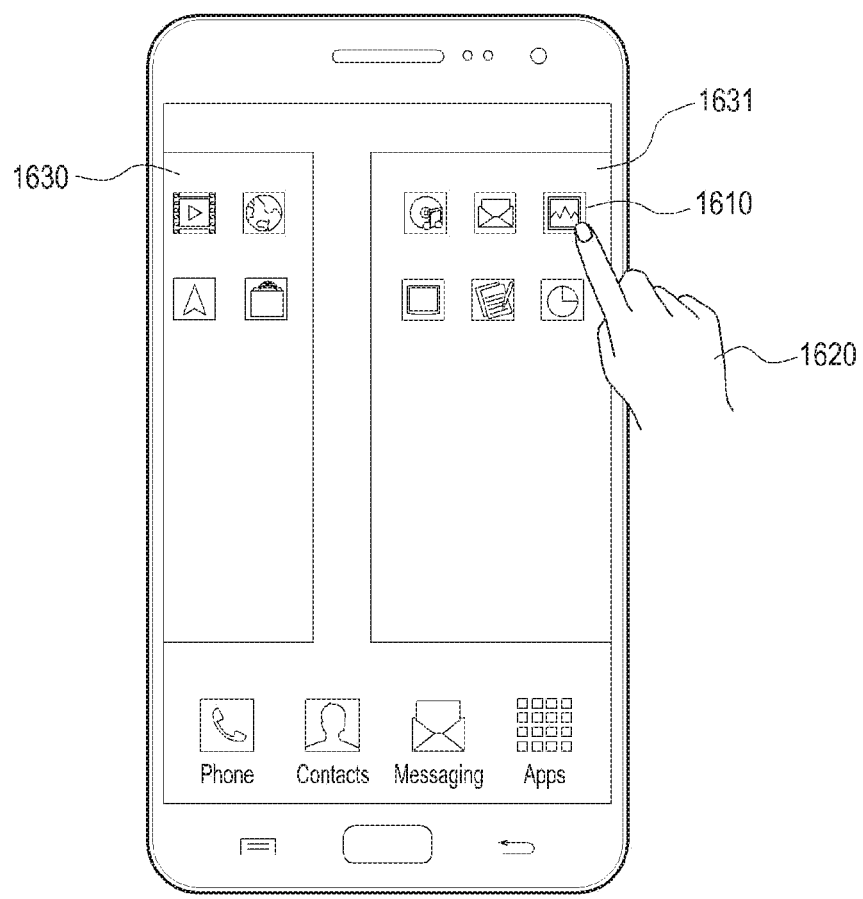

Referring to FIG. 16D, when the speed of the first object 1610 is greater than or equal to the first threshold and less than the second threshold, the electronic device 101 moves the first object 1610 from a first home screen 1630 to a second home screen 1631. The second home screen 1631 may be a home screen displayed through a one-time swipe input of the user in a right direction on the first home screen 1631.

Figure 16E:
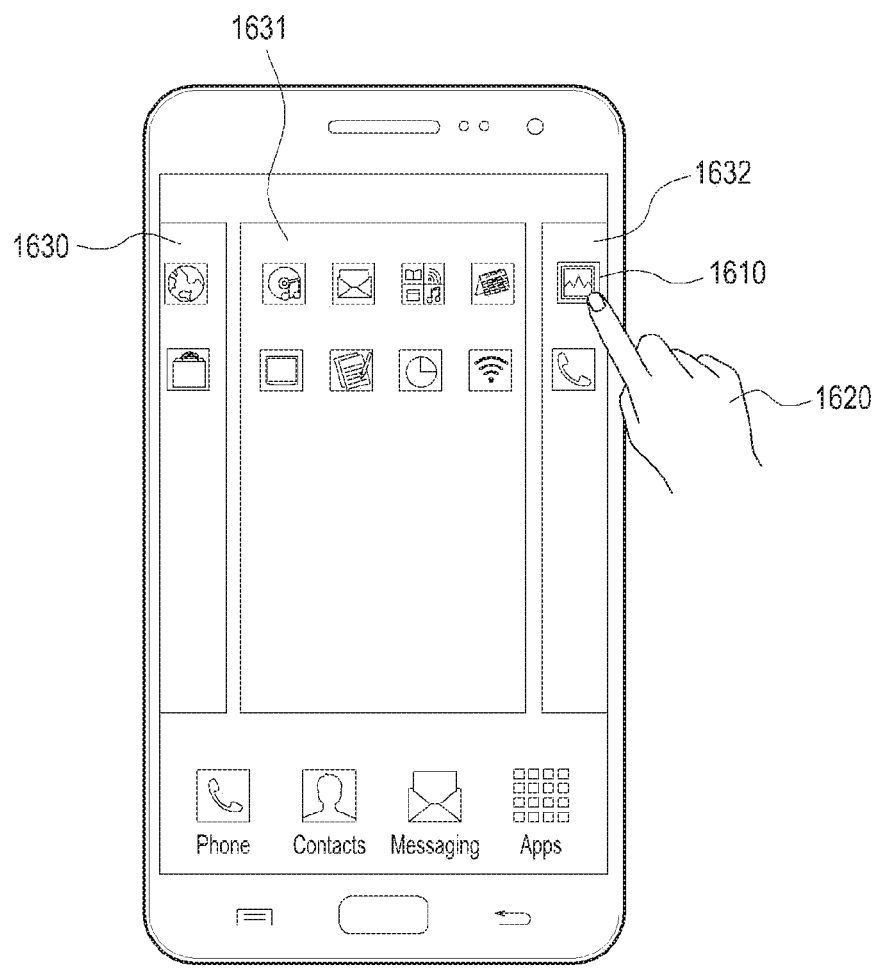

Referring to FIG. 16E, when the speed of the first object 1610 is greater than or equal to the first threshold and the second threshold, the electronic device 101 may move the first object 1610 from the first home screen 1630 to a third home screen 1632. The third home screen 1632 may be a home screen displayed through double swipe inputs of the user in the right direction on the first home screen 1631.

As described above, the electronic device 101 may subdivide and distinguish instructions corresponding to the first input through a plurality of preset thresholds and compare the speed of the first object with the plurality of preset thresholds, so as to determine and process at least one instruction among the subdivided instructions.

Figure 17:
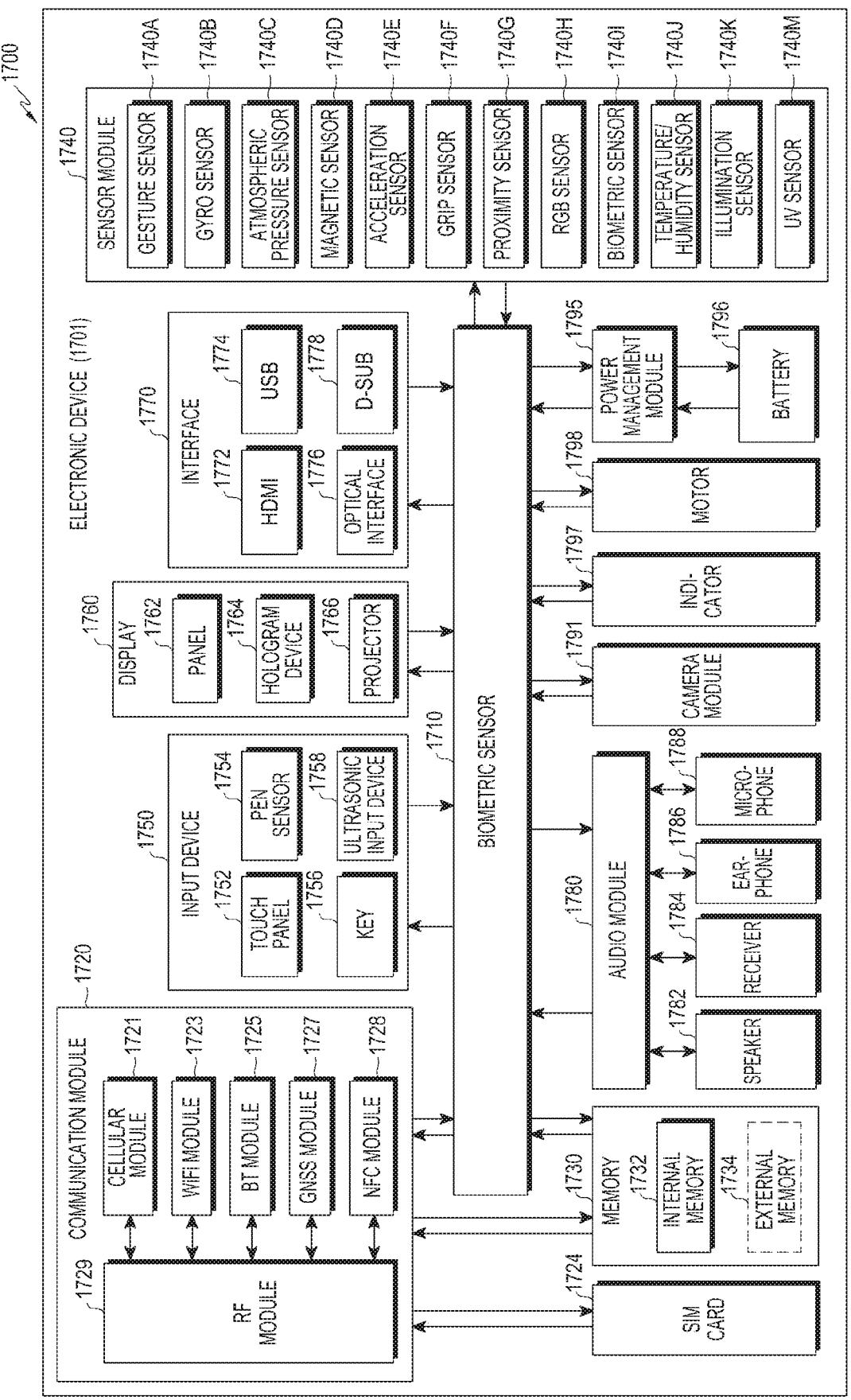
FIG. 17 is a block diagram illustrating an electronic device, according to an embodiment of the present disclosure.

FIG. 17 is a block diagram illustrating an electronic device, according to an embodiment of the present disclosure. An electronic device 1701 may include, for example, the whole or part of the electronic device 101 illustrated in FIG. 1. The electronic device 1701 may include at least one AP 1710, a communication module 1720, a subscriber identification module (SIM) card 1724, a memory 1730, a sensor module 1740, an input device 1750, a display 1760, an interface 1770, an audio module 1780, a camera module 1791, a power management module 1795, a battery 1796, an indicator 1797, and a motor 1798.

The processor 1710 may control a plurality of hardware or software components connected to the processor 1710 by driving an operating system or an application program and perform processing of various pieces of data and calculations. The processor 1710 may be implemented by, for example, a system on chip (SoC). According to an embodiment, the processor 1710 may further include a graphic processing unit (GPU) and/or an image signal processor. The processor 1710 may include at least some of the elements illustrated in FIG. 17 (e.g., a cellular module 1721). The processor 1710 may load, into a volatile memory, instructions or data received from at least one (for example, a non-volatile memory) of the other elements and may process the loaded instructions or data, and may store various data in a non-volatile memory.

The communication module 1720 may have a configuration that is the same as or similar to that of the communication interface of FIG. 1. The communication module 1720 includes, for example, the cellular module 1721, a Wi-Fi module 1723, a Bluetooth module 1725, a GNSS module 1727 (for example, a GPS module, a Glonass module, a Beidou module, or a Galileo module), a near field communication (NFC) module 1728, and a Radio Frequency (RF) module 1729.

The cellular module 1721 may provide a voice call, an image call, a text message service, or an Internet service through, for example, a communication network. According to an embodiment, the cellular module 1721 may distinguish between and authenticate electronic devices 1701 within a communication network using a SIM (for example, the SIM card 1724). According to an embodiment, the cellular module 1721 may perform at least some of the functions that the processor 1710 may provide. According to an embodiment, the cellular module 1721 may include a communication processor (CP).

The Wi-Fi module 1723, the Bluetooth module 1725, the GNSS module 1727, or the NFC module 1728 may include, for example, a processor that processes data transmitted and received through the corresponding module. According to some embodiments, at least some (two or more) of the cellular module 1721, the Wi-Fi module 1723, the BT module 1725, the GNSS module 1727, and the NFC module 1728 may be included in one integrated circuit (IC) or IC package.

The RF module 1729 may transmit/receive, for example, a communication signal (for example, an RF signal). The RF module 1729 may include, for example, a transceiver, a power amp module (PAM), a frequency filter, a low noise amplifier (LNA), or an antenna. According to another embodiment, at least one of the cellular module 1721, the Wi-Fi module 1723, the BT module 1725, the GNSS module 1727, and the NFC module 1728 may transmit/receive an RF signal through a separate RF module.

The subscriber identification module 1724 may include, for example, a card including a subscriber identity module and/or an embedded SIM, and may contain unique identification information (for example, an integrated circuit card identifier (ICCID)) or subscriber information (for example, an international mobile subscriber identity (IMSI)).

The memory 1730 (for example, the memory 130) includes, for example, at least one of an internal memory 1732 and an external memory 1734. The internal memory 1732 may include at least one of, for example, a volatile memory (for example, a dynamic random access memory (RAM) (DRAM), a static RAM (SRAM), a synchronous DRAM (SDRAM), and the like) and a non-volatile memory (for example, a one-time programmable read only memory (ROM) (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash memory), a hard drive, or a solid state drive (SSD).

The external memory 1734 may further include a flash drive, for example, a compact flash (CF), a secure digital (SD), a Micro-SD, a Mini-SD, an extreme digital (xD), a memory stick, or the like. The external memory 1734 may be functionally and/or physically connected to the electronic device 1701 through various interfaces.

The sensor module 1740 may measure, for example, a physical quantity or detect an operation state of the electronic device 1701, and may convert the measured or detected information into an electrical signal. The sensor module 1740 includes, for example, at least one of a gesture sensor 1740A, a gyro sensor 1740B, an atmospheric pressure sensor 1740C, a magnetic sensor 1740D, an acceleration sensor 1740E, a grip sensor 1740F, a proximity sensor 1740G, a color sensor 1740H (for example, a red, green, blue (RGB) sensor), a biometric sensor 1740I, a temperature/humidity sensor 1740J, a light sensor 1740K, and a ultraviolet (UV) sensor 1740M. Additionally or alternatively, the sensor module 1740 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 1740 may further include a control circuit for controlling one or more sensors included therein. In some embodiments, an electronic device 1701 may further include a processor configured to control the sensor module 1740 as a part of or separately from the processor 1710, and may control the sensor module 1740 while the processor 1710 is in a sleep state.

The input device 1750 includes, for example, at least one of a touch panel 1752, a (digital) pen sensor 1754, a key 1756, and an ultrasonic input unit 1758. The touch panel 1752 may use at least one of, for example, a capacitive scheme, a resistive scheme, an infrared scheme, and an ultrasonic scheme. Further, the touch panel 1752 may further include a control circuit. The touch panel 1752 may further include a tactile layer and provide a tactile reaction to the user.

The (digital) pen sensor 1754 may include, for example, a recognition sheet which is a part of the touch panel or is separated from the touch panel. The key 1756 may include, for example, a physical button, an optical key or a keypad. The ultrasonic input device 1758 may detect an ultrasonic wave generated by an input tool through a microphone 1788 and identify data corresponding to the detected ultrasonic wave.

The display 1760 includes at least one of a panel 1762, a hologram device 1764 or a projector 1766. The panel 1762 may be implemented to be, for example, flexible, transparent, or wearable. The panel 1762 and the touch panel 1752 may be implemented as one module. The hologram 1764 may show a three dimensional image in the air by using an interference of light. The projector 1766 may display an image by projecting light onto a screen. The screen may be located, for example, in the interior of or on the exterior of the electronic device 1701. According to an embodiment, the display 1760 may further include a control circuit for controlling the panel 1762, the hologram device 1764, or the projector 1766.

The interface 1770 includes, for example, at least one of a high-definition multimedia interface (HDMI) 1772, a universal serial bus (USB) 1774, an optical interface 1776, or a D-subminiature (D-sub) 1778. Additionally or alternatively, the interface 1770 may include, for example, a mobile high-definition link (MHL) interface, a secure digital (SD) card/multi-media card (MMC) interface, or an infrared data association (IrDA) standard interface.

The audio module 1780 may bilaterally convert, for example, a sound and an electrical signal. At least some elements of the audio module 1780 may be included in, for example, the input/output interface. The audio module 1780 may process sound information which is input or output through, for example, a speaker 1782, a receiver 1784, earphones 1786, the microphone 1788, or the like.

The camera module 1791 is a device that may photograph a still image and a dynamic image. According to an embodiment, the camera module 1791 may include one or more image sensors (for example, a front sensor or a back sensor), a lens, an image signal processor (ISP) or a flash (for example, LED or xenon lamp).

The power management module 1795 may manage, for example, power of the electronic device 1701. According to an embodiment, the power management module 1795 may include a power management integrated circuit (PMIC), a charger IC, or a battery gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 1796, and a voltage, a current, or a temperature during the charging. The battery 1796 may include, for example, a rechargeable battery or a solar battery.

The indicator 1797 may indicate a particular state (for example, a booting state, a message state, a charging state, or the like) of the electronic device 1701 or a part (for example, the processor 1710) of the electronic device 1701. The motor 1798 may convert an electrical signal into mechanical vibration, and may generate vibration, a haptic effect, or the like. The electronic device 1701 may include a processing unit (for example, a GPU) for supporting a mobile television (TV). The processing unit for supporting mobile TV may, for example, process media data according to a certain standard such as digital multimedia broadcasting (DMB) or digital video broadcasting (DVB).

Each of the above-described component elements of hardware according to the present disclosure may be configured with one or more components, and the names of the corresponding component elements may vary based on the type of electronic device. The electronic device, according to embodiments of the present disclosure, may include at least one of the aforementioned elements. Some elements may be omitted or other additional elements may be further included in the electronic device. Also, some of the hardware components may be combined into one entity, which may perform functions identical to those of the relevant components before the combination.

The term "module", as used herein, may, for example, mean a unit including one of hardware, software, and firmware or a combination of two or more of them. The term "module" may be interchangeably used with, for example, the terms "unit", "logic", "logical block", "component", and "circuit". A module may be a minimum unit of an integrated component element or a part thereof. A module may be a minimum unit for performing one or more functions or a part thereof. A module may be mechanically or electronically implemented. For example, a module may include at least one of an application-specific integrated circuit (ASIC) chip, a field-programmable gate array (FPGA), and a programmable-logic device for performing operations which has been known or are to be developed hereinafter.

According to various embodiments, at least some of the devices (for example, modules or functions thereof) or the method (for example, operations may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module, according to embodiments of the present disclosure, may include one or more of the aforementioned components or may further include other additional components, or some of the aforementioned components may be omitted. Operations executed by a module, a programming module, or other component elements may be executed sequentially, in parallel, repeatedly, or in a heuristic manner. Further, some operations may be executed according to another order or may be omitted, or other operations may be added.

According to various embodiments, a storage medium having instructions stored therein is provided. The instructions are configured to allow at least one processor to perform at least one operation when being executed by the at least one processor. The at least one operation may include an operation of receiving a first input related to a first object displayed on a display from a user, an operation of determining a speed of the first object moving according to the received first input, an operation of comparing the determined speed of the first object with a preset threshold, and an operation of executing an instruction corresponding to the first input determined based on a result of the comparison.

While the disclosure has been shown and described with reference to certain embodiments thereof, it will be understood by those skilled in the art that various changes in form and detail may be made therein without departing from the spirit and scope of the invention as defined by the appended claims.

What is claimed is:

1. An electronic device, comprising:
a touchscreen display, and
a processor, wherein the processor is configured to control to:
display, via the touchscreen display, a plurality of graphical objects,
receive a touch drag input on a first graphical object among the plurality of graphical objects, wherein the first graphical object includes a home preview screen,
determine if a movement speed of the touch drag input exceeds a threshold,
determine a direction of the touch drag input,
in response to determining that the movement speed of the touch drag input exceeds the threshold and the direction of the touch drag input is a first direction, control the first graphical object not to be displayed on the touchscreen display while maintaining displaying of other graphical objects among the plurality of graphical objects, wherein the first graphical object is moved according to a movement of the touch drag input, and wherein the touch drag input in the first direction exceeding the threshold causes a home screen corresponding to the home preview screen to be deleted,
in response to determining that the movement speed of the touch drag input does not exceed the threshold and the direction of the touch drag input is the first direction, display a first menu at a first position while at least part of the home preview screen is displayed, wherein the first menu includes a menu for generating at least one folder on the home screen corresponding to the home preview screen, and in response to determining that the direction of the touch drag input is a second direction different from the first direction, display the first menu at a second position different from the first position.

2. The electronic device of claim 1, wherein the first position includes an upper end of the first graphical object.

3. The electronic device of claim 1, wherein the second position includes a lower end of the first graphical object.

4. The electronic device of claim 1, wherein the plurality of graphical objects are displayed side by side on the touchscreen display.

5. An electronic device, comprising:
a touchscreen display, and
a processor, wherein the processor is configured to control to:
   display, via the touchscreen display, a graphical object, wherein the graphical object includes a home preview screen,
   receive a touch input on the graphical object,
   based on determining that a speed type of the touch input is a first speed type and the direction of the touch drag input is a first direction, displaying a first menu at a first position while at least part of the home preview screen is displayed, wherein the first menu includes a menu for generating at least one folder on a home screen corresponding to the home preview screen,
   based on determining that the speed type of the touch input is a second speed type and the direction of the touch drag input is the first direction, controlling the graphical object not to be displayed on the touchscreen display while maintaining displaying other graphical objects among a plurality of graphical objects displayed on the touchscreen display, wherein the graphical object is moved according to a movement of the touch drag input, and wherein the touch drag input in the first direction exceeding the threshold causes the home screen corresponding to the home preview screen to be deleted, and
   based on determining that the direction of the touch drag input is a second direction different from the first direction, displaying the first menu at a second position different from the first position.

6. The electronic device of claim 5, wherein the first position includes an upper end of the first graphical object.

7. The electronic device of claim 5, wherein the second position includes a lower end of the first graphical object.

8. A method for controlling an electronic device, comprising:
displaying, via a touchscreen display of the electronic device, a plurality of graphical objects,
receiving a touch drag input on a first graphical object among the plurality of graphical objects, wherein the first graphical object includes a home preview screen,
determining if a movement speed of the touch drag input exceeds a threshold,
determining a direction of the touch drag input,
in response to determining that the movement speed of the touch drag input exceeds the threshold and the direction of the touch drag input is a first direction, controlling the first graphical object not to be displayed on the touchscreen display while maintaining displaying of other graphical objects among the plurality of graphical objects, wherein the first graphical object is moved according to a movement of the touch drag input, and wherein the touch drag input in the first direction exceeding the threshold causes a home screen corresponding to the home preview screen to be deleted,
in response to determining that the movement speed of the touch drag input does not exceed the threshold and the direction of the touch drag input is the first direction, displaying a first menu at a first position while at least part of the home preview screen is displayed, wherein the first menu includes a menu for generating at least one folder on the home screen corresponding to the home preview screen, and
in response to determining that the direction of the touch drag input is a second direction different from the first direction, displaying the first menu at a second position different from the first position.

9. The method of claim 8, wherein the first menu is displayed on an upper end of the first graphical object.

10. The method of claim 8, wherein the plurality of graphical objects are displayed side by side on the touchscreen display.

* * * * *